United States Patent
Shoji et al.

(10) Patent No.: US 12,444,303 B2
(45) Date of Patent: Oct. 14, 2025

(54) INFORMATION PROCESSING DEVICE, INFORMATION PROCESSING METHOD, PROGRAM, MOBILE DEVICE, AND INFORMATION PROCESSING SYSTEM

(71) Applicant: Sony Group Corporation, Tokyo (JP)

(72) Inventors: Takuya Shoji, Tokyo (JP); Hidehiro Komatsu, Tokyo (JP); Masahiro Tamori, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 145 days.

(21) Appl. No.: 18/259,074

(22) PCT Filed: Dec. 21, 2021

(86) PCT No.: PCT/JP2021/047256
§ 371 (c)(1),
(2) Date: Jun. 23, 2023

(87) PCT Pub. No.: WO2022/145286
PCT Pub. Date: Jul. 7, 2022

(65) Prior Publication Data
US 2024/0054897 A1 Feb. 15, 2024

(30) Foreign Application Priority Data
Jan. 4, 2021 (JP) ................. 2021-000071

(51) Int. Cl.
G08G 1/16 (2006.01)
B60Q 9/00 (2006.01)

(52) U.S. Cl.
CPC ................. *G08G 1/16* (2013.01); *B60Q 9/00* (2013.01)

(58) Field of Classification Search
CPC ........ G08G 1/16; G08G 1/0962; G08G 1/162; G08G 1/005; G08G 1/167; G08G 1/166;
(Continued)

(56) References Cited

U.S. PATENT DOCUMENTS

2009/0102629 A1* 4/2009 Kaller ................... B60Q 9/008
340/435
2018/0186286 A1 7/2018 Groh
(Continued)

FOREIGN PATENT DOCUMENTS

JP H05-126948 A 5/1993
JP 2002-127854 A 5/2002
(Continued)

OTHER PUBLICATIONS

Kumon, Hitoshi, Vehicle Warning Device, Dec. 20, 2007, JP2007328603A, English Translation, 1-17 (Year: 2007).*
(Continued)

*Primary Examiner* — Brian A Zimmerman
*Assistant Examiner* — Cal J Eustaquio
(74) *Attorney, Agent, or Firm* — XSENSUS LLP

(57) ABSTRACT

The present technology relates to an information processing device, an information processing method, a program, a mobile device, and an information processing system that can improve accuracy of recognition of a direction in which an object is present on the periphery of a mobile device such as a vehicle.

An information processing device includes a recognizing section configured to perform detection processing for an object on a periphery of a mobile device, and a warning sound control section configured to control a feature quantity of a first warning sound, the first warning sound indicating presence of the object, and a position of a sound image of the first warning sound, according to a position of the detected object. The present technology is applicable to, for example, mobile devices such as vehicles.

14 Claims, 18 Drawing Sheets

(58) Field of Classification Search
CPC ... B60Q 9/00; B60Q 9/008; B60W 2050/143; B60W 50/14
See application file for complete search history.

(56) References Cited

U.S. PATENT DOCUMENTS

| | | | | |
|---|---|---|---|---|
| 2020/0130580 | A1* | 4/2020 | Yasue | G06V 20/58 |
| 2020/0148201 | A1* | 5/2020 | King | B60W 30/0956 |
| 2021/0000006 | A1* | 1/2021 | Ellaboudy | A01B 69/008 |
| 2022/0179423 | A1* | 6/2022 | Kakuta | G05D 1/0077 |
| 2023/0413026 | A1* | 12/2023 | Khosla | G08G 1/096783 |

FOREIGN PATENT DOCUMENTS

| | | |
|---|---|---|
| JP | 2007-253721 A | 10/2007 |
| JP | 2007-328603 A | 12/2007 |
| JP | 2011118753 A | 6/2011 |
| JP | 2012-146316 A | 8/2012 |
| JP | 2018062296 A | 4/2018 |

OTHER PUBLICATIONS

International Search Report and Written Opinion mailed on Feb. 1, 2022, received for PCT Application PCT/JP2021/047256, filed on Dec. 21, 2021, 9 pages including English Translation.

* cited by examiner

INFORMATION PROCESSING DEVICE, INFORMATION PROCESSING METHOD, PROGRAM, MOBILE DEVICE, AND INFORMATION PROCESSING SYSTEM

CROSS-REFERENCE TO RELATED APPLICATIONS

The present application is based on PCT filing PCT/JP2021/047256, filed Dec. 21, 2021, which claims priority to Japanese Application No. 2021-000071, filed Jan. 4, 2021, the entire contents of each are incorporated herein by reference.

TECHNICAL FIELD

The present technology relates to an information processing device, an information processing method, a program, a mobile device, and an information processing system, and particularly to an information processing device, an information processing method, a program, a mobile device, and an information processing system suitable for use in a case of outputting warning sound for an object on the periphery of a mobile device.

BACKGROUND ART

Conventionally, there has been proposed a technology which localizes a sound image of warning sound in a direction of an object present on the periphery of a vehicle by using sound image localization control, and thereby makes a driver recognize the direction in which the object is present (see PTL 1, for example).

CITATION LIST

Patent Literature

[PTL 1]
Japanese Patent Laid-open No. 2007-253721

SUMMARY

Technical Problem

In the technology that localizes the sound image of the warning sound in the direction of the object present on the periphery of the vehicle by using sound localization control as described in PTL 1, there has been a demand for improvement in accuracy of recognition of the direction in which the object is present.

The present technology has been made in view of such circumstances, and is to improve accuracy of recognition of a direction in which an object is present on the periphery of a mobile device such as a vehicle.

Solution to Problem

An information processing device according to a first aspect of the present technology includes a recognizing section configured to perform detection processing for an object on a periphery of a mobile device, and a warning sound control section configured to control a feature quantity of a first warning sound, the first warning sound indicating presence of the object, and a position of a sound image of the first warning sound, according to a position of the detected object.

An information processing method according to the first aspect of the present technology includes the steps of performing detection processing for an object on a periphery of a mobile device, and controlling a feature quantity of a warning sound, the warning sound indicating presence of the object, and a position of a sound image of the warning sound, according to a position of the detected object.

A program according to the first aspect of the present technology makes a computer perform processing including performing detection processing for an object on a periphery of a mobile device, and controlling a feature quantity of a warning sound, the warning sound indicating presence of the object, and a position of a sound image of the warning sound, according to a position of the detected object.

In the first aspect of the present technology, detection processing for an object on the periphery of a mobile device is performed, and a feature quantity of a warning sound, the warning sound indicating the presence of the object, and the position of a sound image of the warning sound are controlled according to the position of the detected object.

A mobile device according to a second aspect of the present technology includes a recognizing section configured to perform detection processing for an object on a periphery of the mobile device, and a warning sound control section configured to control a feature quantity of a warning sound, the warning sound indicating presence of the object, and a position of a sound image of the warning sound, according to a position of the detected object.

In the second aspect of the present technology, detection processing for an object on a periphery is performed, and a feature quantity of a warning sound, the warning sound indicating the presence of the object, and the position of a sound image of the warning sound are controlled according to the position of the detected object.

An information processing system according to a third aspect of the present technology includes a sensor unit configured to sense a periphery of a mobile device, a recognizing section configured to perform detection processing for an object on the periphery of the mobile device in reference to a result of sensing by the sensor unit, a warning sound control section configured to control a feature quantity of a warning sound, the warning sound indicating presence of the object, and a position of a sound image of the warning sound, according to a position of the detected object, and a speaker configured to output the warning sound under control of the warning sound control section.

In the third aspect of the present technology, the sensing of the periphery of a mobile device is performed, detection processing for an object on the periphery of the mobile device is performed in reference to a result of sensing, a feature quantity of a warning sound, the warning sound indicating the presence of the object, and the position of a sound image of the warning sound are controlled according to the position of the detected object, and the warning sound is output.

DESCRIPTION OF EMBODIMENT

A mode for carrying out the present technology will hereinafter be described. The description will be given in the following order.
1. Example of Configuration of Vehicle Control System
2. Embodiment
3. Modifications
4. Others

1. Example of Configuration of Vehicle Control System

Figure 1:
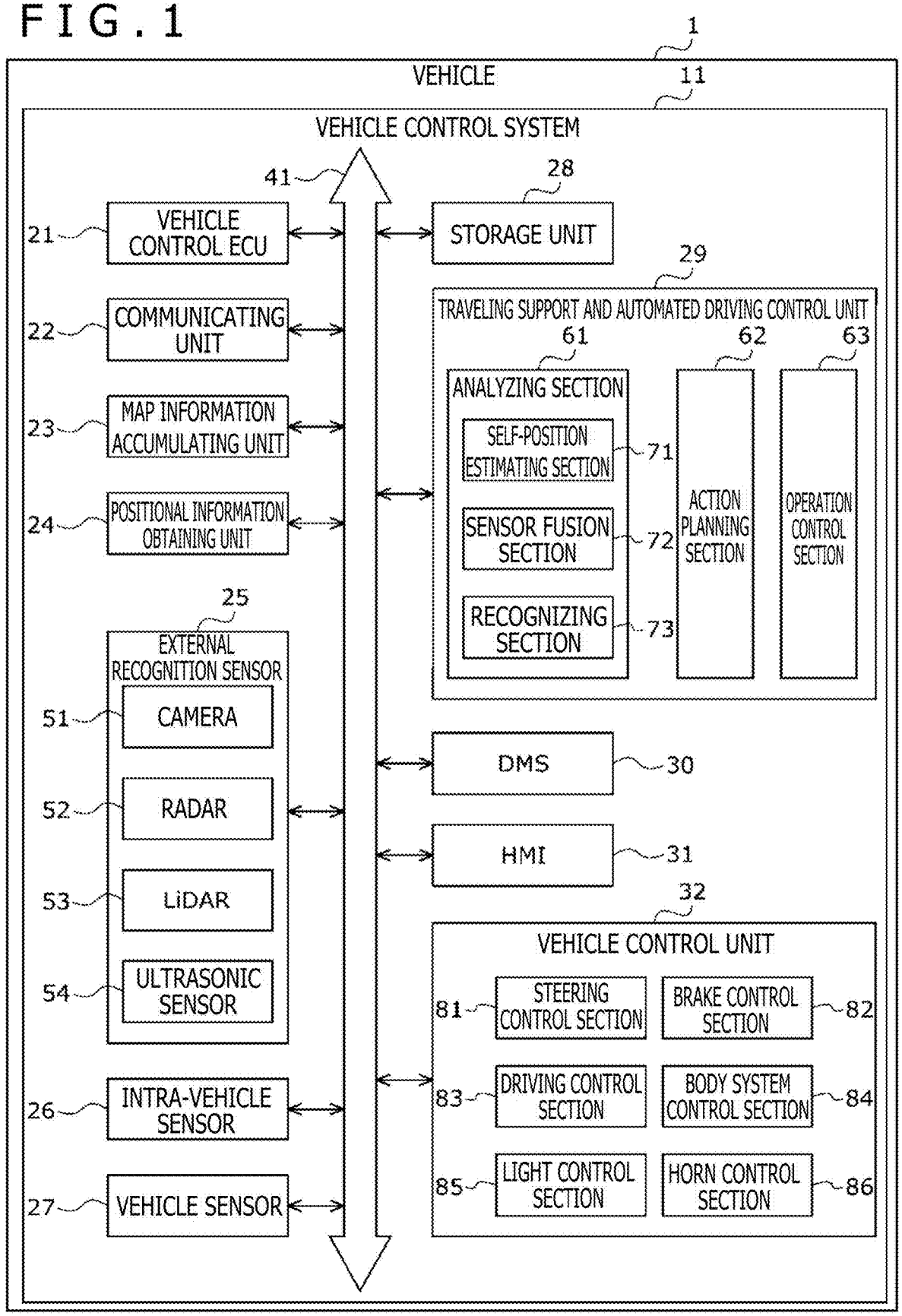
FIG. 1 is a block diagram illustrating an example of a configuration of a vehicle control system.

FIG. 1 is a block diagram illustrating an example of a configuration of a vehicle control system 11 as an example of a mobile device control system to which the present technology is applied.

The vehicle control system 11 is provided in a vehicle 1, and performs processing related to traveling support and automated driving of the vehicle 1.

The vehicle control system 11 includes a vehicle control ECU (Electronic Control Unit) 21, a communicating unit 22, a map information accumulating unit 23, a positional information obtaining unit 24, an external recognition sensor 25, an intra-vehicle sensor 26, a vehicle sensor 27, a storage unit 28, a traveling support and automated driving control unit 29, a DMS (Driver Monitoring System) 30, an HMI (Human Machine Interface) 31, and a vehicle control unit 32.

The vehicle control ECU 21, the communicating unit 22, the map information accumulating unit 23, the positional information obtaining unit 24, the external recognition sensor 25, the intra-vehicle sensor 26, the vehicle sensor 27, the storage unit 28, the traveling support and automated driving control unit 29, the driver monitoring system (DMS) 30, the human machine interface (HMI) 31, and the vehicle control unit 32 are mutually communicably connected to one another via a communication network 41. The communication network 41 includes, for example, a vehicle-mounted communication network, a bus, or the like complying with a standard of digital two-way communication, such as a CAN (Controller Area Network), a LIN (Local Interconnect Network), a LAN (Local Area Network), FlexRay (registered trademark), or Ethernet (registered trademark). Different communication networks 41 may be used according to the kind of transmitted data. For example, the CAN may be applied to data related to vehicle control, and Ethernet may be applied to high-volume data. Incidentally, the parts of the vehicle control system 11 may be directly connected to one another with use of wireless communication where, for example, a relatively short-range communication is assumed, such as short-range wireless communication (NFC (Near Field Communication)), or Bluetooth (registered trademark) without the intervention of the communication network 41.

Incidentally, in the following, the description regarding the communication network 41 will be omitted in cases where the parts of the vehicle control system 11 communicate with one another via the communication network 41. For example, in a case where the vehicle control ECU 21 and the communicating unit 22 communicate with each other via the communication network 41, description will be made simply such that the vehicle control ECU 21 and the communicating unit 22 communicate with each other.

The vehicle control ECU 21 includes, for example, various kinds of processors such as a CPU (Central Processing Unit) and an MPU (Micro Processing Unit). The vehicle control ECU 21 controls the whole or a part of functions of the vehicle control system 11.

The communicating unit 22 communicates with various apparatuses inside the vehicle and outside the vehicle, other vehicles, servers, base stations, and the like, and transmit and receive various kinds of data. At this time, the communicating unit 22 can perform communication using multiple communication systems.

Communication with the outside of the vehicle which can be performed by the communicating unit 22 will be described briefly. The communicating unit 22, for example, communicates with a server present on an external network (which will hereinafter be referred to as an external server) or the like via a base station or an access point by a wireless communication system such as 5G (fifth generation mobile communication system), LTE (Long Term Evolution), or DSRC (Dedicated Short Range Communications). The external network on which the communicating unit 22 performs communication is, for example, the Internet, a cloud network, a network unique to a business entity, or the like. A communication system by which the communicating unit 22 performs communication on the external network is not particularly limited to any kind as long as the communication system is a wireless communication system allowing digital two-way communication at a predetermined communication speed or higher and over a predetermined distance or more.

In addition, the communicating unit 22 can, for example, perform communication with a terminal present in the vicinity of the own vehicle by using a P2P (Peer To Peer) technology. The terminal present in the vicinity of the own vehicle is, for example, a terminal worn by a mobile body moving at a relatively low speed, the mobile body being a pedestrian, a bicycle, or the like, a terminal fixed and installed at a position in a store or the like, or an MTC (Machine Type Communication) terminal. Further, the communicating unit 22 can also perform V2X communication. V2X communication refers, for example, to communication between the own vehicle and others, such as vehicle-to-vehicle (Vehicle to Vehicle) communication with another vehicle, road-to-vehicle (Vehicle to Infrastructure) communication with a roadside unit or the like, communication with a house (Vehicle to Home), or pedestrian-to-vehicle (Vehicle to Pedestrian) communication with a terminal carried by a pedestrian.

The communicating unit 22 can, for example, externally receive a program for updating software that controls the operation of the vehicle control system 11 (Over The Air). The communicating unit 22 can further externally receive map information, traffic information, information regarding the periphery of the vehicle 1, and the like. In addition, the communicating unit 22 can, for example, transmit information regarding the vehicle 1, the information regarding the periphery of the vehicle 1, and the like to the outside. The information regarding the vehicle 1 which is transmitted to the outside by the communicating unit 22 includes, for example, data indicating the state of the vehicle 1, a result of recognition by a recognizing section 73, and the like. Further, the communicating unit 22, for example, performs communication supporting a vehicle emergency notification system such as eCall.

The communicating unit 22, for example, receives electromagnetic waves transmitted by a road traffic information communication system (VICS (Vehicle Information and Communication System) (registered trademark)) such as a radio wave beacon, a light beacon, or FM multiplex broadcasting.

Communication with the inside of the vehicle which can be performed by the communicating unit 22 will be described briefly. The communicating unit 22 can, for example, communicate with various apparatuses within the vehicle by using wireless communication. The communicating unit 22 can, for example, perform wireless communication with apparatuses within the vehicle by a communication system enabling digital two-way communication at a predetermined communication speed or higher by wireless communication, such as a wireless LAN, Bluetooth, NFC, or WUSB (Wireless USB). Without being limited to this, the communicating unit 22 can also communicate with the various apparatuses within the vehicle by using wired communication. For example, the communicating unit 22 can communicate with the various apparatuses within the vehicle by wired communication via a cable connected to a connection terminal not illustrated. The communicating unit 22 can, for example, communicate with the various apparatuses within the vehicle by a communication system enabling digital two-way communication at a predetermined communication speed or higher by wired communication, such as USB (Universal Serial Bus), HDMI (High-Definition Multimedia Interface) (registered trademark), or MHL (Mobile High-definition Link).

Here, the apparatuses within the vehicle refer to, for example, apparatuses not connected to the communication network 41 within the vehicle. Assumed as the apparatuses within the vehicle are, for example, a mobile apparatus or a wearable apparatus carried by an occupant such as a driver, an information apparatus carried into the vehicle and installed therein temporarily, and the like.

The map information accumulating unit 23 accumulates one of or both an externally obtained map and a map generated by the vehicle 1. For example, the map information accumulating unit 23 accumulates a three-dimensional high-precision map, a global map having lower precision than the high-precision map but covering a wide area, and the like.

The high-precision map is, for example, a dynamic map, a point cloud map, a vector map, or the like. The dynamic map is, for example, a map including four layers of dynamic information, quasi-dynamic information, quasi-static information, and static information. The dynamic map is supplied from an external server or the like to the vehicle 1. The point cloud map is a map including a point cloud (point group data). The vector map is, for example, a map in which traffic information such as the positions of lanes and traffic lights is associated with the point cloud map, and is adapted to an ADAS (Advanced Driver Assistance System) or AD (Autonomous Driving).

The point cloud map and the vector map may, for example, be supplied from an external server or the like, or may be generated in the vehicle 1 as a map for performing matching with a local map to be described later, in reference to results of sensing by cameras 51, radars 52, LiDARs 53, and the like, and accumulated in the map information accumulating unit 23. In addition, in a case where the high-precision map is supplied from an external server or the like, map data for a few hundred meters square, for example, which is related to a planned route on which the vehicle 1 is to travel hereafter, is obtained from the external server or the like in order to reduce a communication volume.

The positional information obtaining unit 24 receives a GNSS (Global Navigation Satellite System) signal from a GNSS satellite, and thereby obtains positional information regarding the vehicle 1. The obtained positional information is supplied to the traveling support and automated driving control unit 29. Incidentally, the positional information obtaining unit 24 is not limited to a system using the GNSS signal, and may obtain the positional information by using a beacon, for example.

The external recognition sensor 25 includes various kinds of sensors used to recognize conditions outside the vehicle 1. The external recognition sensor 25 supplies sensor data from each sensor to various parts of the vehicle control system 11. The kinds and numbers of sensors included in the external recognition sensor 25 are optional.

The external recognition sensor 25, for example, includes the cameras 51, the radars 52, the LiDARs (Light Detection and Ranging, Laser Imaging Detection and Ranging) 53, and ultrasonic sensors 54. Without being limited to this, the external recognition sensor 25 may have a configuration including one kind or more of sensors among the cameras 51, the radars 52, the LiDARs 53, and the ultrasonic sensors 54. The numbers of the cameras 51, the radars 52, the LiDARs 53, and the ultrasonic sensors 54 are not particularly limited to any number as long as the numbers are those that can actually be installed in the vehicle 1. In addition, the kinds of sensors included in the external recognition sensor 25 are not limited to the present example, and the external recognition sensor 25 may include other kinds of sensors. An example of sensing regions of the respective sensors included in the external recognition sensor 25 will be described later.

It is to be noted that a photographing system of the cameras 51 is not particularly limited to any kind. For example, cameras of various kinds of photographing systems such as a ToF (Time Of Flight) camera, a stereo camera, a monocular camera, and an infrared camera as photographing systems capable of distance measurement can be applied as the cameras 51 as required. Without being limited to this, the cameras 51 may not be involved in distance measurement, and may simply be one to obtain a photographed image.

In addition, for example, the external recognition sensor 25 can include an environmental sensor for detecting an environment for the vehicle 1. The environmental sensor is a sensor for detecting the environment including atmospheric conditions, weather, brightness, and the like. The environmental sensor can, for example, include various kinds of sensors such as a raindrop sensor, a fog sensor, a sunshine sensor, a snow sensor, and an illuminance sensor.

Further, the external recognition sensor 25, for example, includes a microphone used for the detection of the positions of sound and a sound source on the periphery of the vehicle 1 and the like.

The intra-vehicle sensor 26 includes various kinds of sensors for detecting information regarding the inside of the vehicle. The intra-vehicle sensor 26 supplies sensor data from each sensor to various parts of the vehicle control system 11. The kinds and numbers of the various kinds of sensors included in the intra-vehicle sensor 26 are not particularly limited to any kind or number as long as the kinds and the numbers are those that can actually be installed in the vehicle 1.

For example, the intra-vehicle sensor 26 can include one or more kinds of sensors among a camera, a radar, a seating sensor, a steering wheel sensor, a microphone, and a biosensor. Cameras of various kinds of photographing systems capable of distance measurement, such as a ToF camera, a stereo camera, a monocular camera, and an infrared camera, for example, can be used as cameras included in the intra-vehicle sensor 26. Without being limited to this, the cameras included in the intra-vehicle sensor 26 may not be involved in distance measurement, and may simply be one to obtain a photographed image. The biosensor included in the intra-vehicle sensor 26 is, for example, provided to a seat, a steering wheel, or the like to detect various kinds of biological information regarding an occupant such as the driver.

The vehicle sensor 27 includes various kinds of sensors for detecting the state of the vehicle 1. The vehicle sensor 27 supplies sensor data from each sensor to various parts of the vehicle control system 11. The kinds and numbers of the various kinds of sensors included in the vehicle sensor 27 are not particularly limited to any kind or number as long as the kinds and the numbers are those that can actually be installed in the vehicle 1.

For example, the vehicle sensor 27 includes a speed sensor, an acceleration sensor, an angular velocity sensor (gyro sensor), and an inertial measurement unit (IMU (Inertial Measurement Unit)) in which these sensors are integrated. For example, the vehicle sensor 27 includes a steering angle sensor that detects the steering angle of a steering wheel, a yaw rate sensor, an accelerator sensor that detects an amount of operation of an accelerator pedal, and a brake sensor that detects an amount of operation of a brake pedal. For example, the vehicle sensor 27 includes a rotation sensor that detects the rotational speed of an engine or a motor, an air pressure sensor that detects the air pressure of a tire, a slip ratio sensor that detects the slip ratio of a tire, and a wheel speed sensor that detects the rotational speed of a wheel. For example, the vehicle sensor 27 includes a battery sensor that detects the remaining capacity and temperature of a battery and an impact sensor that detects an impact from the outside.

The storage unit 28 includes at least one of a nonvolatile storage medium and a volatile storage medium. The storage unit 28 stores data and programs. The storage unit 28 is used as an EEPROM (Electrically Erasable Programmable Read Only Memory) and a RAM (Random Access Memory), for example. A magnetic storage device such as an HDD (Hard Disc Drive), a semiconductor storage device, an optical storage device, and a magneto-optical storage device can be applied as the storage medium. The storage unit 28 stores various kinds of programs and data used by various parts of the vehicle control system 11. For example, the storage unit 28 includes an EDR (Event Data Recorder) and a DSSAD (Data Storage System for Automated Driving), and stores information regarding the vehicle 1 and information obtained by the intra-vehicle sensor 26 before and after such an event as an accident.

The traveling support and automated driving control unit 29 controls traveling support and automated driving of the vehicle 1. The traveling support and automated driving control unit 29, for example, includes an analyzing section 61, an action planning section 62, and an operation control section 63.

The analyzing section 61 performs analysis processing of the vehicle 1 and surrounding conditions. The analyzing section 61 includes a self-position estimating section 71, a sensor fusion section 72, and a recognizing section 73.

The self-position estimating section 71 estimates the self-position of the vehicle 1 in reference to the sensor data from the external recognition sensor 25 and the high-precision map accumulated in the map information accumulating unit 23. For example, the self-position estimating section 71 generates a local map in reference to the sensor data from the external recognition sensor 25, and estimates the self-position of the vehicle 1 by performing matching between the local map and the high-precision map. The center of a rear wheel pair axle, for example, is set as a reference for the position of the vehicle 1.

The local map is, for example, a three-dimensional high-precision map, an occupancy grid map (Occupancy Grid Map), or the like generated with use of a technology of SLAM (Simultaneous Localization and Mapping) or the like. The three-dimensional high-precision map is, for example, the above-described point cloud map or the like. The occupancy grid map is a map on which a three-dimensional or two-dimensional space on the periphery of the vehicle 1 is divided into grids (lattices) of a predetermined size and occupancy states of objects are indicated in grid units. The occupancy state of an object is, for example, indicated by the presence or absence or an existence probability of the object. The local map is, for example, used also for detection processing and recognition processing of conditions outside the vehicle 1 by the recognizing section 73.

Incidentally, the self-position estimating section 71 may estimate the self-position of the vehicle 1 in reference to the positional information obtained by the positional information obtaining unit 24 and the sensor data from the vehicle sensor 27.

The sensor fusion section 72 performs sensor fusion processing that obtains new information by combining multiple different kinds of sensor data (for example, image data supplied from the cameras 51 and sensor data supplied from the radars 52). Methods for combining the different kinds of sensor data include integration, fusion, association, and the like.

The recognizing section 73 performs detection processing of detecting conditions outside the vehicle 1 and recognition processing of recognizing the conditions outside the vehicle 1.

For example, the recognizing section 73 performs the detection processing and the recognition processing of the conditions outside the vehicle 1 in reference to information from the external recognition sensor 25, information from the self-position estimating section 71, information from the sensor fusion section 72, and the like.

Specifically, for example, the recognizing section 73 performs the detection processing and recognition processing of an object on the periphery of the vehicle 1 or the like. The detection processing for the object is, for example, processing of detecting the presence or absence, size, shape, position, movement, and the like of the object. The recognition processing of the object is, for example, processing of recognizing an attribute such as a kind of the object and identifying the specific object. However, the detection processing and the recognition processing are not necessarily clearly separate from each other, and may overlap each other.

For example, the recognizing section 73 detects the object on the periphery of the vehicle 1 by performing clustering that classifies the point cloud based on the sensor data of the radars 52, the LiDARs 53, or the like into each cluster of a point group. The presence or absence, size, shape, and position of the object on the periphery of the vehicle 1 are thereby detected.

For example, the recognizing section 73 detects the movement of the object on the periphery of the vehicle 1 by performing tracking that follows the movement of the cluster of the point group classified by the clustering. The speed and traveling direction (movement vector) of the object on the periphery of the vehicle 1 are thereby detected.

For example, the recognizing section 73 detects or recognizes a vehicle, a human, a bicycle, an obstacle, a structure, a road, a signal, a traffic sign, a road marking, and the like in reference to image data supplied from the cameras 51. In addition, the recognizing section 73 may recognize the kind of the object on the periphery of the vehicle 1 by performing recognition processing such as semantic segmentation.

For example, the recognizing section 73 can perform recognition processing of a traffic rule on the periphery of the vehicle 1 in reference to the maps accumulated in the map information accumulating unit 23, a result of the estimation of the self-position by the self-position estimating section 71, and a result of the recognition of the object on the periphery of the vehicle 1 by the recognizing section 73. By this processing, the recognizing section 73 can recognize the position and state of traffic lights, the details of a traffic sign and a road marking, the details of a traffic regulation, a lane in which traveling can be performed, and the like.

For example, the recognizing section 73 can perform recognition processing of an environment on the periphery of the vehicle 1. Assumed as the environment on the periphery which is to be recognized by the recognizing section 73 are weather, atmospheric temperature, humidity, brightness, the state of a road surface, and the like.

The action planning section 62 generates an action plan for the vehicle 1. For example, the action planning section 62 generates the action plan by performing processing of path planning and path following.

Incidentally, the path planning (Global path planning) is processing of planning a general path from a start to a goal. This path planning also includes processing referred to as trajectory planning, which performs trajectory generation (Local path planning) enabling safe and smooth traveling in the vicinity of the vehicle 1 in a planned path, in consideration of motion characteristics of the vehicle 1.

The path following is processing of planning operation for traveling safely and accurately in the path planned by the path planning within a planned time. The action planning section 62 can, for example, calculate a target speed and a target angular velocity of the vehicle 1 in reference to a result of the processing of the path following.

The operation control section 63 controls the operation of the vehicle 1 in order to realize the action plan generated by the action planning section 62.

For example, the operation control section 63 controls a steering control section 81, a brake control section 82, and a driving control section 83 included in the vehicle control unit 32 to be described later, and thereby performs acceleration/deceleration control and direction control such that the vehicle 1 travels in a trajectory calculated by the trajectory planning. For example, the operation control section 63 performs cooperative control with an objective of implementing functions of the ADAS such as collision avoidance or impact mitigation, following traveling, vehicle speed maintaining traveling, a collision warning of the own vehicle, and a lane deviation warning of the own vehicle. For example, the operation control section 63 performs cooperative control with an objective of automated driving or the like for autonomously traveling without depending on the operation of the driver.

The DMS 30 performs authentication processing of the driver, recognition processing of the state of the driver, and the like in reference to the sensor data from the intra-vehicle sensor 26 and input data input to the HMI 31 to be described later or the like. Assumed as the state of the driver which is to be recognized are, for example, a physical condition, a degree of awakening, a degree of concentration, a degree of fatigue, a sight line direction, a degree of intoxication, a driving operation, a posture, and the like.

Incidentally, the DMS 30 may perform authentication processing of an occupant(s) other than the driver and recognition processing of the state of the occupant(s). In addition, for example, the DMS 30 may perform recognition processing of conditions within the vehicle in reference to the sensor data from the intra-vehicle sensor 26. Assumed as the conditions within the vehicle which are to be recognized are, for example, atmospheric temperature, humidity, brightness, odor, and the like.

The HMI 31 inputs various kinds of data, instructions, and the like, and presents various kinds of data to the driver and the like.

The input of the data by the HMI 31 will be described briefly. The HMI 31 includes an input device for a human to input data. The HMI 31 generates input signals in reference to data, instructions, and the like input by the input device, and supplies the input signals to various parts of the vehicle control system 11. The HMI 31 includes, for example, as the input device, operating elements such as a touch panel, a button, a switch, and a lever. Without being limited to this, the HMI 31 may further include an input device that allows information to be input by a method other than manual operation, that is, by a voice, a gesture, or the like. Further, the HMI 31 may, for example, use, as an input device, a remote control device using infrared rays or radio waves or an external connection apparatus such as a mobile apparatus or a wearable apparatus supporting operation of the vehicle control system 11.

The presentation of the data by the HMI 31 will be described briefly. The HMI 31 generates visual information, auditory information, and tactile information for the occupant(s) or the outside of the vehicle. In addition, the HMI 31 performs output control that controls the output of each piece of generated information, output contents, output timing, an output method, and the like. The HMI 31 generates and outputs, for example, as the visual information, information represented by an image or light, such as an operating screen, display of the state of the vehicle 1, warning display, and a monitor image indicating conditions on the periphery of the vehicle 1. In addition, the HMI 31 generates and outputs, for example, as the auditory information, information represented by sound, such as a voice guidance, a warning sound, and a warning message. Further, the HMI 31 generates and outputs, as the tactile information, information given to the tactile sense of an occupant by, for example, a force, a vibration, a movement, and the like.

Applicable as an output device to which the HMI 31 outputs the visual information are, for example, a display device that presents the visual information through display of an image by the display device itself and a projector device that presents the visual information by projecting an image. Incidentally, in addition to the display device having an ordinary display, the display device may also be a device that displays the visual information within a field of view of the occupant, the device being, for example, a head-up display, a transmissive display, a wearable device having an AR (Augmented Reality) function, or the like. In addition, the HMI 31 can also use a display device included in a navigation apparatus, an instrument panel, a CMS (Camera Monitoring System), an electronic mirror, a lamp, or the like provided to the vehicle 1, as an output device to which the visual information is to be output.

Applicable as an output device to which the HMI 31 outputs the auditory information are, for example, an audio speaker, headphones, and earphones.

Applicable as an output device to which the HMI 31 outputs the tactile information is, for example, a haptic element using a haptic technology. The haptic element is, for example, provided to a part that the occupant of the vehicle 1 touches, such as the steering wheel or a seat.

The vehicle control unit 32 controls various parts of the vehicle 1. The vehicle control unit 32 includes the steering control section 81, the brake control section 82, the driving control section 83, a body system control section 84, a light control section 85, and a horn control section 86.

The steering control section 81 performs detection and control or the like of the state of a steering system of the vehicle 1. The steering system, for example, includes a steering mechanism including the steering wheel and the like, an electric power steering, and the like. The steering control section 81, for example, includes a steering ECU that controls the steering system, an actuator that drives the steering system, and the like.

The brake control section 82 performs detection and control or the like of the state of a brake system of the vehicle 1. The brake system, for example, includes a brake mechanism including the brake pedal and the like, an ABS (Antilock Brake System), a regenerative brake mechanism, and the like. The brake control section 82, for example, includes a brake ECU that drives the brake system, an actuator that drives the brake system, and the like.

The driving control section 83 performs detection and control or the like of the state of a driving system of the vehicle 1. The driving system, for example, includes the accelerator pedal, a driving force generating device for generating a driving force, such as an internal combustion engine or a driving motor, a driving force transmitting mechanism for transmitting the driving force to wheels, and the like. The driving control section 83, for example, includes a driving ECU that controls the driving system, an actuator that drives the driving system, and the like.

The body system control section 84 performs detection and control or the like of the state of a body system of the vehicle 1. The body system includes, for example, a keyless entry system, a smart key system, a power window device, power seats, an air conditioning device, air bags, seat belts, a shift lever, and the like. The body system control section 84, for example, includes a body system ECU that controls the body system, an actuator that drives the body system, and the like.

The light control section 85 performs detection and control or the like of the states of various kinds of lights of the vehicle 1. Assumed as the lights to be controlled are, for example, headlights, backup lights, fog lights, turn signals, brake lights, projections, bumper indications, and the like. The light control section 85 includes a light ECU that controls the lights, an actuator that drives the lights, and the like.

The horn control section 86 performs detection and control or the like of the state of a car horn of the vehicle 1. The horn control section 86, for example, includes a horn ECU that controls the car horn, an actuator that drives the car horn, and the like.

2. Embodiment

An embodiment of the present technology will next be described with reference to FIGS. 2 to 17.

Example of Configuration of External Recognition Sensor 25 and Intra-Vehicle Sensor 26

Figure 2:
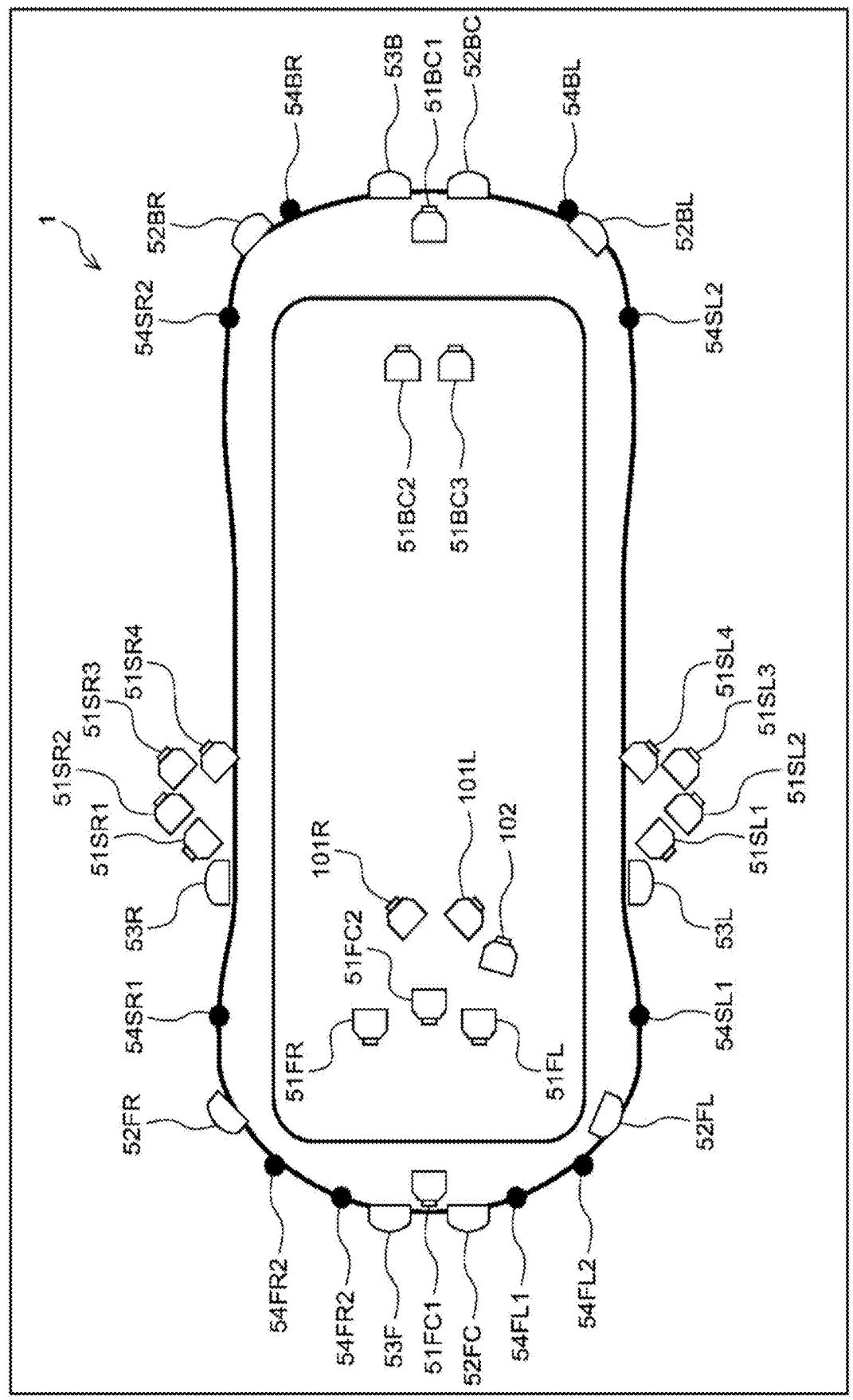
FIG. 2 is a diagram illustrating an example of installation positions of cameras, LiDARs, radars, and ultrasonic sensors.

FIG. 2 illustrates an example of installation positions of the cameras 51, the radars 52, the LiDARs 53, and the ultrasonic sensors 54 included in the external recognition sensor 25 of the vehicle 1 as well as the cameras included in the intra-vehicle sensor 26. In the present example, the external recognition sensor 25 includes cameras 51FC1 to 51BC3, radars 52FC to 52BR, LiDARs 53F to 53B, and ultrasonic sensors 54FL1 to 54BR. The intra-vehicle sensor 26 includes cameras 101L to 102.

The camera 51FC1 is provided in the vicinity of the center of a front end of the vehicle 1. The camera 51FC1 performs photographing in a forward direction of the vehicle 1. A fish-eye camera, for example, is used as the camera 51FC1. The camera 51FC1 is, for example, used for the ADAS and a surround view. The surround view is, for example, a function of displaying an image of the periphery of the vehicle 1 and a bird's-eye image of the periphery of the vehicle 1 as viewed from above.

The camera 51FC2 is provided in the vicinity of the center of the front of an interior of the vehicle 1. The camera 51FC2 performs photographing in the forward direction of the vehicle 1 via a windshield. The camera 51FC2 is, for example, used for the ADAS. An image captured by the camera 51FC2 is, for example, recorded in a driving recorder.

The camera 51FL and the camera 51FR are arranged left and right at a predetermined distance from each other in the front of the interior of the vehicle 1. The camera 51FL and the camera 51FR constitute a stereo camera. The camera 51FL and the camera 51FR perform photographing in the forward direction of the vehicle 1 via the windshield. The camera 51FL and the camera 51FR are, for example, used for the ADAS. Cameras having a higher resolution than the camera 51FC2, for example, are used as the camera 51FL and the camera 51FR.

The cameras 51SL1 to 51SL4 are provided on a left side surface of the vehicle 1 and in the vicinity of a front end of a door of a driver's seat.

The camera 51SL1 performs photographing in a leftwardly obliquely forward direction of the vehicle 1. The camera 51SL1 is, for example, used for the ADAS.

The camera 51SL2 performs photographing in a left direction of the vehicle 1. A fish-eye camera having a wider angle than the camera 51SL1, the camera 51SL3, and the camera 51SL4, for example, is used as the camera 51SL2. The camera 51SL2 is, for example, used for the ADAS and the surround view.

The camera 51SL3 performs photographing in a leftwardly obliquely rearward direction of the vehicle 1. A camera having a higher resolution than the camera 51SL1, for example, is used as the camera 51SL3. The camera 51SL3 is, for example, used for the ADAS.

The camera 51SL4 performs photographing in a leftwardly obliquely rearward direction of the vehicle 1. The optical axis of the camera 51SL4 is directed in a direction close to the rearward direction of the vehicle 1 than the optical axis of the camera 51SL3. In other words, the optical axis of the camera 51SL3 is directed in a direction close to the left direction (lateral direction) of the vehicle 1 than the optical axis of the camera 51SL4. The camera 51SL4 is, for example, used for the CMS.

The cameras 51SR1 to 51SR4 are provided on a right side surface of the vehicle 1 and in the vicinity of a front end of a door of a front passenger seat.

The camera 51SR1 performs photographing in a rightwardly obliquely forward direction of the vehicle 1. The camera 51SR1 is, for example, used for the ADAS.

The camera 51SR2 performs photographing in a right direction of the vehicle 1. A fish-eye camera having a wider angle than the camera 51SR1, the camera 51SR3, and the camera 51SR4, for example, is used as the camera 51SR2. The camera 51SR2 is, for example, used for the ADAS and the surround view.

The camera 51SR3 performs photographing in a rightwardly obliquely rearward direction of the vehicle 1. A camera having a higher resolution than the camera 51SR1, for example, is used as the camera 51SR3. The camera 51SR3 is, for example, used for the ADAS.

The camera 51SR4 performs photographing in a rightwardly obliquely rearward direction of the vehicle 1. The optical axis of the camera 51SR4 is directed in a direction close to the rearward direction of the vehicle 1 than the optical axis of the camera 51SR3. In other words, the optical axis of the camera 51SR3 is directed in a direction close to the right direction (lateral direction) of the vehicle 1 than the optical axis of the camera 51SR4. The camera 51SR4 is, for example, used for the CMS.

The camera 51BC1 is provided in the vicinity of the center of a rear end of the vehicle 1. The camera 51BC1 performs photographing in the rearward direction of the vehicle 1. A fish-eye camera, for example, is used as the camera 51BC1. The camera 51BC1 is, for example, used for the ADAS and the surround view.

The camera 51BC2 and the camera 51BC3 are provided in the vicinity of the center of the rear of the interior of the vehicle 1. The camera 51BC2 and the camera 51BC3 perform photographing in the rearward direction of the vehicle 1 via a rear window. The camera 51BC2 is, for example, used for the CMS. The camera 51BC3 is, for example, used for the ADAS. An image captured by the camera 51BC3 is, for example, recorded in the driving recorder.

The radar 52FC is provided in the vicinity of the center of the front end of the vehicle 1. The radar 52FC performs sensing in the forward direction of the vehicle 1.

The radar 52FL is provided in the vicinity of a left end of the front end of the vehicle 1. The radar 52FL performs sensing in the leftwardly obliquely forward direction of the vehicle 1.

The radar 52FR is provided in the vicinity of a right end of the front end of the vehicle 1. The radar 52FR performs sensing in the rightwardly obliquely forward direction of the vehicle 1.

The radar 52BC is provided in the vicinity of the center of the rear end of the vehicle 1. The radar 52BC performs sensing in the rearward direction of the vehicle 1.

The radar 52BL is provided in the vicinity of a left end of the rear end of the vehicle 1. The radar 52BL performs sensing in the leftwardly obliquely rearward direction of the vehicle 1.

The radar 52BR is provided in the vicinity of a right end of the rear end of the vehicle 1. The radar 52BR performs sensing in the rightwardly obliquely rearward direction of the vehicle 1.

The LiDAR 53F is provided in the vicinity of the center of the front end of the vehicle 1. The LiDAR 53F performs sensing in the forward direction of the vehicle 1.

The LiDAR 53L is provided in the front of the left side surface of the vehicle 1. The LiDAR 53L performs sensing in the left direction of the vehicle 1.

The LiDAR 53R is provided in the front of the right side surface of the vehicle 1. The LiDAR 53R performs sensing in the right direction of the vehicle 1.

The LiDAR 53B is provided in the vicinity of the center of the rear end of the vehicle 1. The LiDAR 53B performs sensing in the rearward direction of the vehicle 1.

The ultrasonic sensor 54FL1 is provided slightly to the left of the center of the front end of the vehicle 1. The ultrasonic sensor 54FL1 performs sensing in a direction slightly to the left of the front of the vehicle 1.

The ultrasonic sensor 54FL2 is provided in the vicinity of the left end of the front end of the vehicle 1. The ultrasonic sensor 54FL1 performs sensing in a forwardly obliquely leftward direction of the vehicle 1.

The ultrasonic sensor 54FR1 is provided slightly to the right of the center of the front end of the vehicle 1. The ultrasonic sensor 54FR1 performs sensing in a direction slightly to the right of the front of the vehicle 1.

The ultrasonic sensor 54FR2 is provided in the vicinity of the right end of the front end of the vehicle 1. The ultrasonic sensor 54FR1 performs sensing in a forwardly rightward oblique direction of the vehicle 1.

The ultrasonic sensor 54SL1 is provided in the front of the left side surface of the body of the vehicle 1. The ultrasonic sensor 54SL1 performs sensing in the left direction in the front of the vehicle 1.

The ultrasonic sensor 54SL2 is provided in the rear of the left side surface of the body of the vehicle 1. The ultrasonic sensor 54SL2 performs sensing in the left direction in the rear of the vehicle 1.

The ultrasonic sensor 54SR1 is provided in the front of the right side surface of the body of the vehicle 1. The ultrasonic sensor 54SR1 performs sensing in the right direction in the front of the vehicle 1.

The ultrasonic sensor 54SR2 is provided in the rear of the right side surface of the body of the vehicle 1. The ultrasonic sensor 54SR2 performs sensing in the right direction in the rear of the vehicle 1.

The ultrasonic sensor 54BL is provided in the vicinity of the left end of the rear end of the vehicle 1. The ultrasonic sensor 54BL performs sensing in a rearwardly obliquely leftward direction of the vehicle 1.

The ultrasonic sensor 54BR is provided in the vicinity of the right end of the rear end of the vehicle 1. The ultrasonic sensor 54BR performs sensing in a rearwardly rightward oblique direction of the vehicle 1.

The camera 101L is provided in a rightwardly obliquely upward direction of the driver's seat within the vehicle. The camera 101L photographs the driver's seat and vicinities thereof. A ToF camera, for example, is used as the camera 101L.

The camera 101R is provided in a leftwardly obliquely upward direction of the front passenger seat within the vehicle. The camera 101R photographs the front passenger seat and vicinities thereof. A ToF camera, for example, is used as the camera 101R.

The camera 102 is provided slightly to the left of a center on a dashboard within the vehicle. The camera 102 captures an image of the driver's seat and the vicinities thereof.

Installation Positions of Speakers

An example of installation positions of speakers within the vehicle 1 will next be described.

Figure 3:
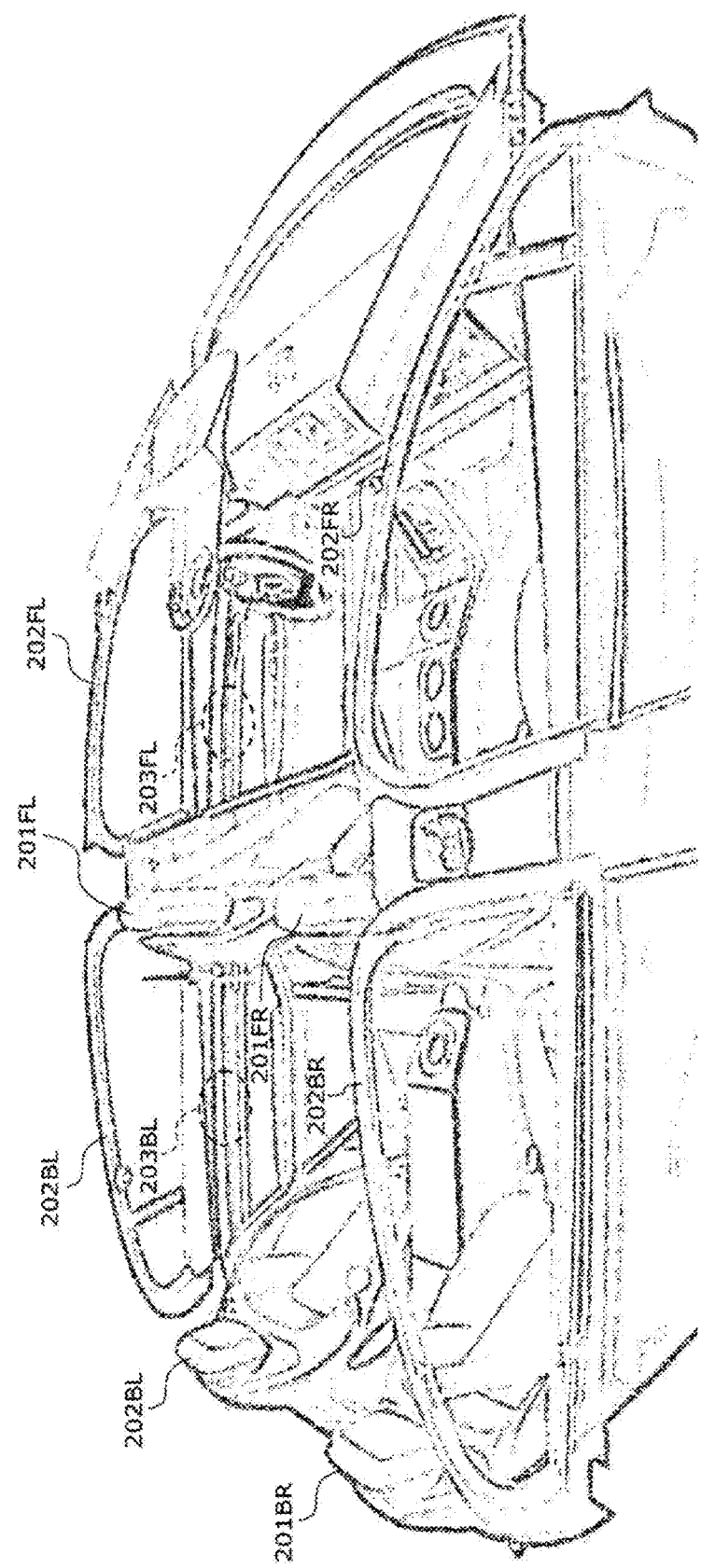
FIG. 3 is a schematic diagram of the interior of a vehicle as viewed downward from a right direction.

As illustrated in FIG. 3, in a door 202FL on a driver's seat 201FL side, a speaker 203FL is embedded slightly forward of a backrest of the driver's seat 201FL. Though not illustrated in the figure, in a door 202FR on a front passenger seat 201FR side, a speaker 203FR is embedded slightly forward of a backrest of the front passenger seat 201FR. In a door 202BL on a left rear seat 201BL side, a speaker 203BL is embedded slightly forward of a backrest of the rear seat 201BL. Though not illustrated in the figure, in a door 202BR on a right rear seat 201BR side, a speaker 203BR is embedded slightly forward of a backrest of the rear seat 201BR.

Figure 4:
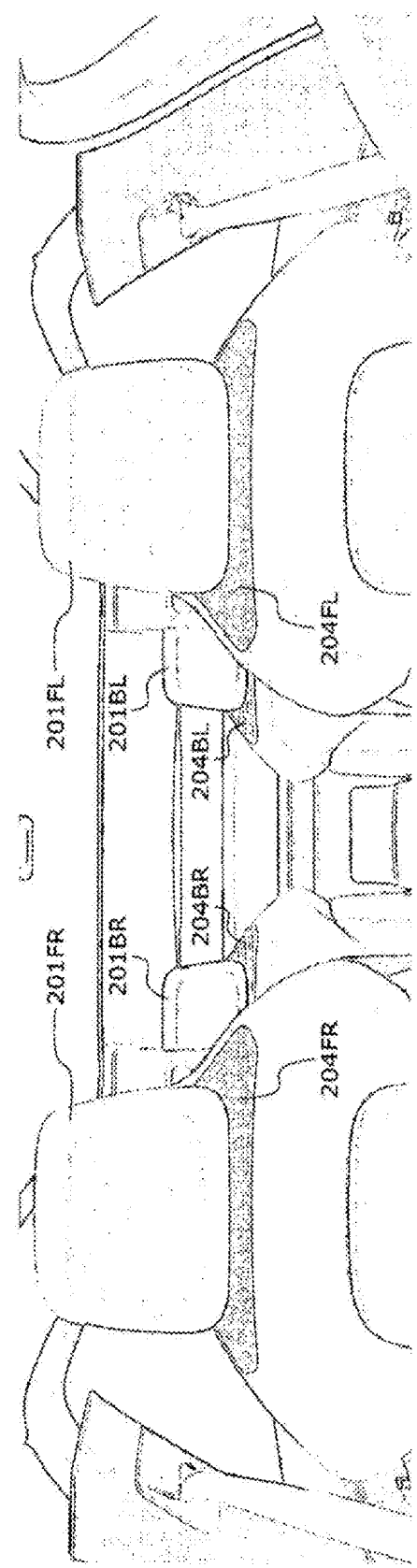
FIG. 4 is a schematic diagram of the interior of the vehicle as viewed from a front.

As illustrated in FIG. 4, a seat speaker 204FL is embedded below a headrest of the driver's seat 201FL. A seat speaker 204FR is embedded below a headrest of the front passenger seat 201FR. A seat speaker 204BL is embedded in the rear seat 201BL on the left side. A seat speaker 204BR is embedded in the rear seat 201BR on the right side.

Incidentally, in the following, in cases where the driver's seat 201FL to the rear seat 201BR do not need to be individually distinguished from each other, the driver's seat 201FL to the rear seat 201BR will simply be referred to as seats 201. In the following, in cases where the doors 202FL to 202BR do not need to be individually distinguished from each other, the doors 202FL to 202BR will simply be referred to as doors 202. In the following, in cases where the speakers 203FL to 203BR do not need to be individually distinguished from each other, the speakers 203FL to 203BR will simply be referred to as speakers 203. In the following, in cases where the seat speakers 204FL to 204BR do not need to be individually distinguished from each other, the seat speakers 204FL to 204BR will simply be referred to as seat speakers 204.

The speakers 203 embedded in the respective doors 202 are, for example, used to output sound to the whole of the inside of the vehicle (all occupants within the vehicle). In addition, 360 reality audio (registered trademark) (in the following, the 360 reality audio will be referred to as 360RA) is realized by the speakers 203.

Here, 360RA is a technology that individually arranges sound images (virtual sound sources) of respective pieces of sound at desired positions within a spherical space, and controls the output of sound so as to make a listener listen to the respective pieces of sound such that the respective pieces of sound are sounding from directions of the respective sound images. With use of 360RA, the occupants can, for example, enjoy a moving image, music, or the like with realistic sound within the vehicle. In addition, the occupants can be made to recognize the position of an object or the like present on the periphery of the vehicle 1.

On the other hand, the seat speakers 204 of the respective seats 201 are, for example, used mainly to output private sound targeted for the individual occupants sitting in the respective seats 201. That is, sound output from each of the seat speakers 204 is individually controlled.

Incidentally, the shape of each seat 201 and the position of each seat speaker 204 are adjusted such that persons of various heights (sitting heights) can clearly hear the sound of the seat speakers 204 of the respective seats 201.

In addition, this speaker arrangement is an example, and can be changed. For example, a speaker may be disposed on the dashboard in the front of the vehicle 1.

Warning Sound Control Section

Figure 5:
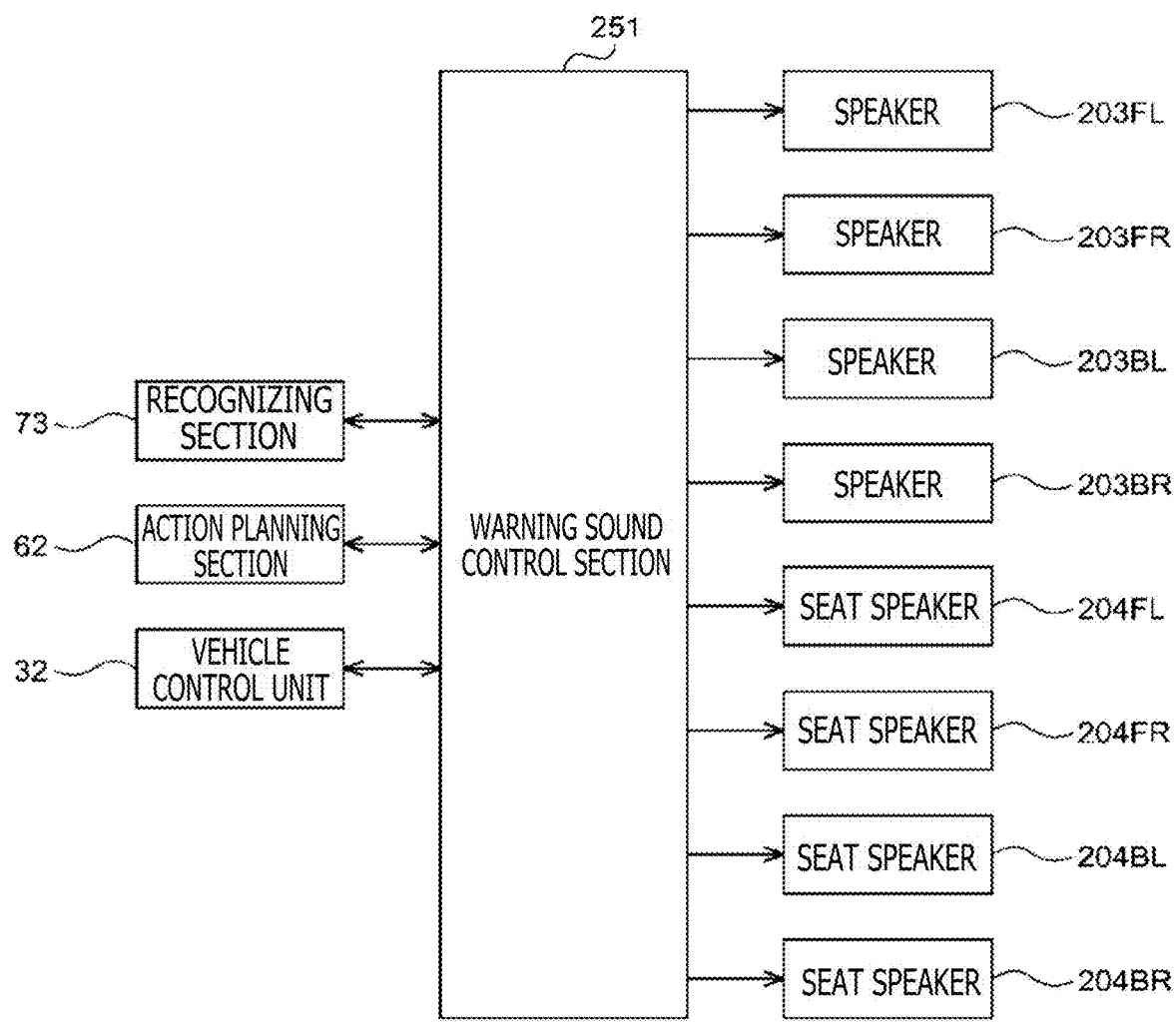
FIG. 5 is a block diagram illustrating a configuration related to a warning sound control section.

FIG. 5 illustrates an example of a configuration related to a warning sound control section 251 as a part of the functions of the HMI 31.

The warning sound control section 251 controls the output of warning sound by controlling the speakers 203 and the seat speakers 204 in reference to a result of recognition by the recognizing section 73, the action plan generated by the action planning section 62, states of control of various parts of the vehicle 1 by the vehicle control unit 32, and the like.

Here, the warning sound, for example, includes warning sound for notifying the occupant(s) of the vehicle 1 of dangerous conditions and warning sound for notifying an object on the periphery of the vehicle 1 (for example, a bicycle, a pedestrian, or the like) of dangerous conditions. The former warning sound is, for example, warning sound for indicating the presence of an object on the periphery of the vehicle 1 or a dangerous place, and alerting the occupant(s) inside the vehicle. The latter warning sound is, for example, warning sound for indicating the presence of the vehicle 1 to the object on the periphery of the vehicle 1, and alerting the object on the periphery of the vehicle 1.

In addition, as will be described later, the warning sound control section 251 controls the position of the sound image (virtual sound source) of the warning sound and feature quantities of the warning sound. Here, the feature quantities of the warning sound include, for example, a volume (amplitude), a pitch (frequency), a tone (waveform and frequency components), a rhythm (rhythm), a melody (melody), a harmony (harmony), and the like.

Warning Sound Control Processing

Figure 6:
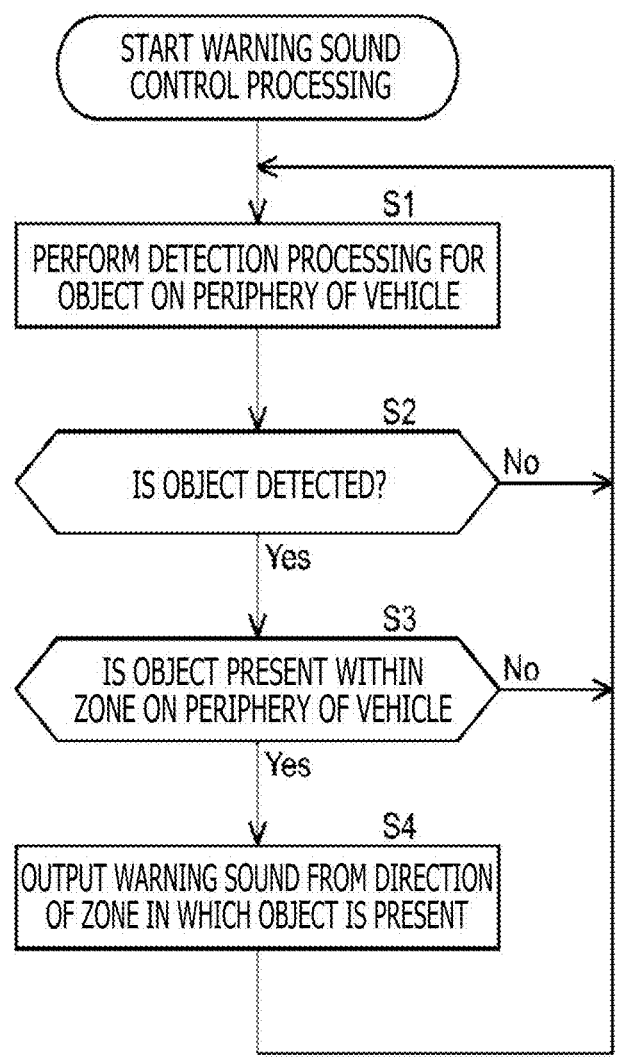
FIG. 6 is a flowchart of assistance in explaining warning sound control processing.

Warning sound control processing performed by the vehicle 1 will next be described with reference to a flowchart of FIG. 6.

This processing is, for example, started when an operation for starting the vehicle 1 and starting driving is performed, for example, when an ignition switch, a power switch, a start switch, or the like of the vehicle 1 is turned on. In addition, this processing is, for example, ended when an operation for ending the driving of the vehicle 1 is performed, for example, when the ignition switch, the power switch, the start switch, or the like of the vehicle 1 is turned off.

In step S1, the recognizing section 73 performs detection processing for an object on the periphery of the vehicle 1. For example, as described above, the recognizing section 73 performs the detection processing for an object on the periphery of the vehicle 1 in reference to information from the external recognition sensor 25, information from the self-position estimating section 71, information from the sensor fusion section 72, and the like. The recognizing section 73 thereby detects the position of the object on the periphery of the vehicle 1. Incidentally, this object detection processing may include the above-described object recognition processing.

Here, the recognizing section 73 may enhance detection accuracy by correcting a result of the detection of the position of the object with use of curvature information and gradient information of a road on which the vehicle 1 is traveling.

For example, in a case where the vehicle 1 is traveling on a curved road, the recognizing section 73 estimates the curvature of the road in reference to input images from the cameras 51. Alternatively, for example, in a case where the vehicle 1 is traveling on a curved road, the recognizing section 73 detects the curvature of the actual road in reference to the high-precision map such as the dynamic map. Then, the recognizing section 73 corrects a result of detection of the positions of other vehicles and the like that are traveling on the same curved road, according to the curvature of the road.

For example, in a case where the vehicle 1 is traveling on a slope, the recognizing section 73 estimates the gradient of the road in reference to sensor data from the acceleration sensor included in the vehicle sensor 27. Alternatively, for example, in a case where the vehicle 1 is traveling on a slope, the recognizing section 73 detects the gradient of the actual road in reference to the high-precision map such as the dynamic map. Then, the recognizing section 73 corrects a result of detection of the positions in a pitch direction of other vehicles and the like that are traveling on the same slope, according to the gradient of the road.

In addition, as required, the recognizing section 73 detects the movement and speed (for example, speed relative to the vehicle 1) or the like of the object. Further, as required, the recognizing section 73 identifies such attributes as a kind, a size, and a shape of the object on the periphery of the vehicle 1.

In step S2, the recognizing section 73 determines whether or not an object is detected, in reference to a result of the processing of step S1. In a case where it is determined that no object is detected, the processing returns to step S1.

The processing of step S1 and step S2 is thereafter repeatedly performed until it is determined in step S2 that an object is detected.

In a case where it is determined in step S2 that an object is detected, on the other hand, the processing proceeds to step S3.

In step S3, the recognizing section 73 determines whether or not the object is present in a zone on the periphery of the vehicle 1.

Specifically, the recognizing section 73 sets zones for defining a range as a target for outputting warning sound and a direction in which to output the warning sound on the periphery of the vehicle 1.

Figure 7:
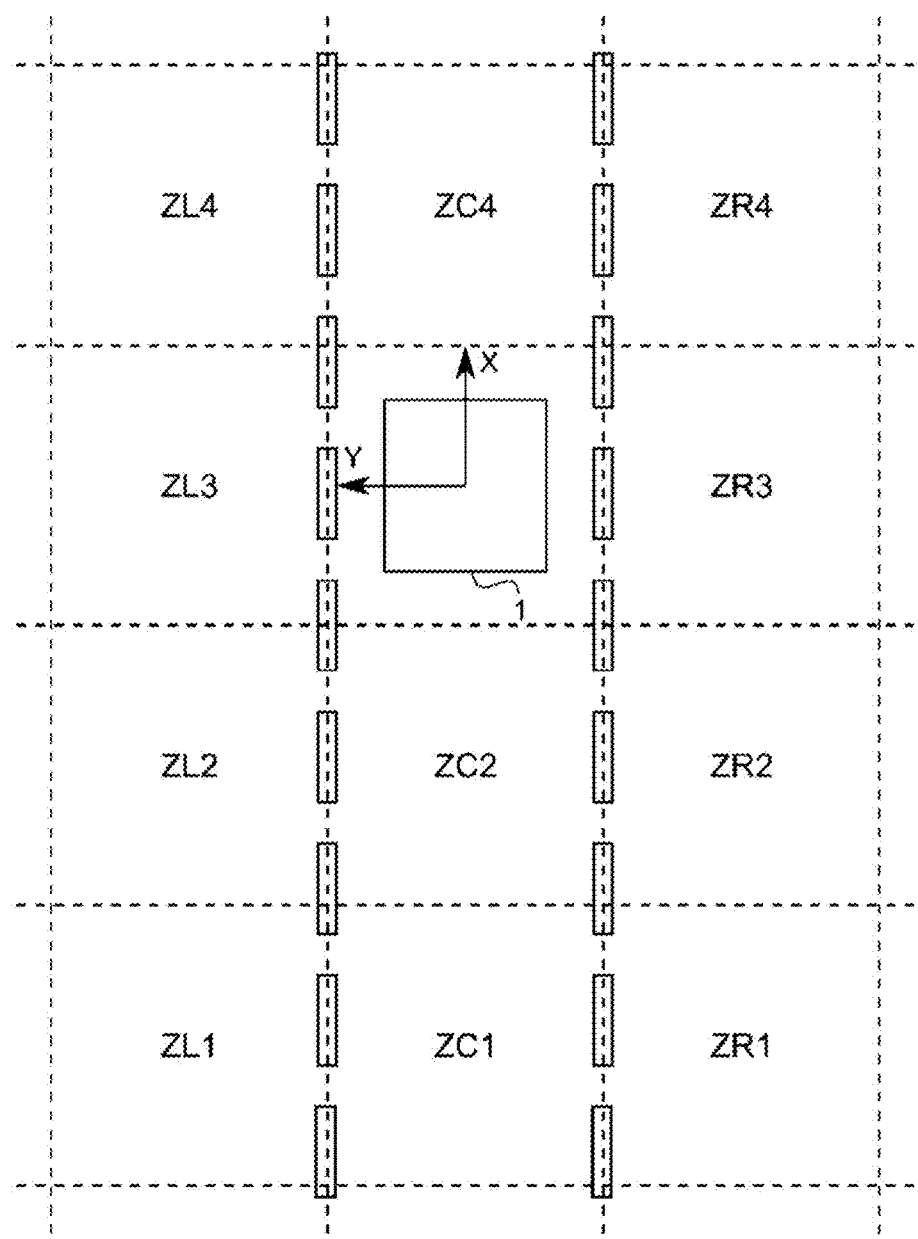
FIG. 7 is a diagram illustrating an example of setting of zones in a planar direction.

FIG. 7 illustrates an example of a zone setting method. In the present example, the vehicle 1 is traveling on a road having at least three lanes or more on one side, and zones ZL1 to ZR4 are set on the periphery of the vehicle 1.

Incidentally, in the following, suppose that an axis directed in the traveling direction of the vehicle 1 is an X-axis and that an axis perpendicular to the X-axis and directed in the left direction of the vehicle 1 is a Y-axis.

The zones ZL1 to ZR4 are rectangular regions of substantially the same size. The zone ZC1, the zone ZC2, and the zone ZC4 are arranged in a traveling lane of the vehicle 1. The zone ZC2 is disposed immediately in the rear of the vehicle 1. The zone ZC1 is set in the rear of the zone ZC2. The zone ZC4 is disposed immediately in front of the vehicle 1.

The zones ZL1 to ZL4 are arranged in a lane on the left side of the traveling lane of the vehicle 1. The zones ZR1 to ZR4 are arranged in a lane on the right side of the traveling lane of the vehicle 1. The zone ZL1 and the zone ZR1 are arranged at the same position as the zone ZC1 in the X-axis direction. The zone ZL2 and the zone ZR2 are arranged at the same position as the zone ZC2 in the X-axis direction. The zone ZL3 and the zone ZR3 are arranged at the same position as the vehicle 1 in the X-axis direction. The zone ZL4 and the zone ZR4 are arranged at the same position as the zone ZC4 in the X-axis direction.

For example, in a case where the detected object is located outside a range of the zones ZL1 to ZR4, the recognizing section 73 determines that the object is not present within the zones, and the processing returns to step S1.

The processing of steps S1 to S3 is thereafter repeatedly performed until it is determined in step S3 that an object is present within the zones on the periphery of the vehicle 1.

On the other hand, in step S3, in a case where the detected object is located within the range of one of the zones ZL1 to ZR4, the recognizing section 73 determines that the object is present within the zone on the periphery of the vehicle 1, and the processing proceeds to step S4.

In step S4, the vehicle 1 outputs a warning sound from the direction of the zone in which the object is present. Specifically, the recognizing section 73 supplies the warning sound control section 251 with information indicating the zone in which the object is present and a kind, a size, and the like of the object.

The warning sound control section 251 generates warning sound data for outputting the warning sound for the detected object. The warning sound control section 251 makes the warning sound output by supplying the generated warning sound data to the speakers 203FL to 203BR.

Figure 8:
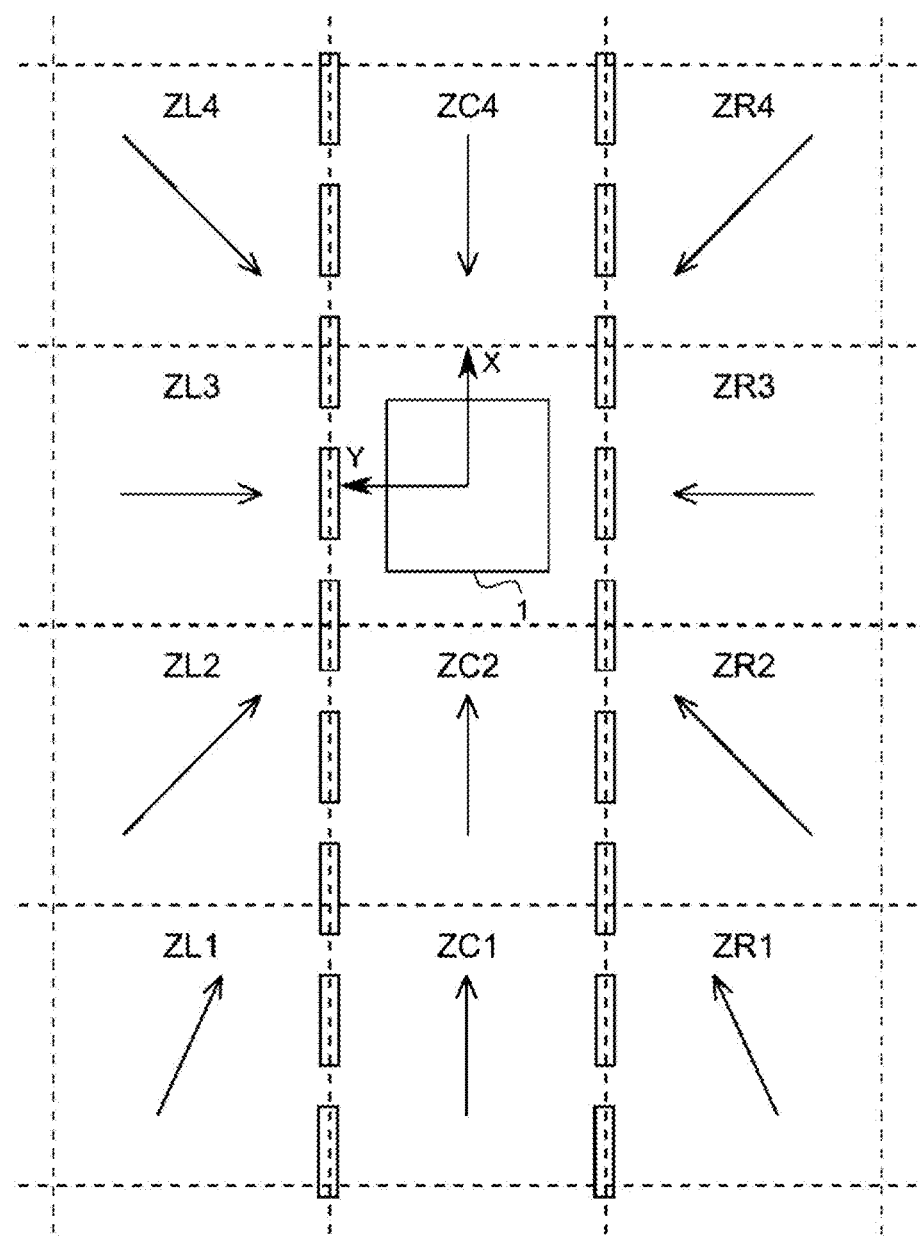
FIG. 8 is a diagram illustrating a direction from which a warning sound for an object within each zone is heard.

At this time, as indicated by an arrow within each zone in FIG. 8, for example, the warning sound control section 251 sets the position of a sound image (virtual sound source) of the warning sound such that the warning sound is heard at a reference position (for example, the head of the driver) within the vehicle 1 from the direction of the zone in which the object is detected. The driver can thereby intuitively recognize the direction of the detected object.

Figure 9:
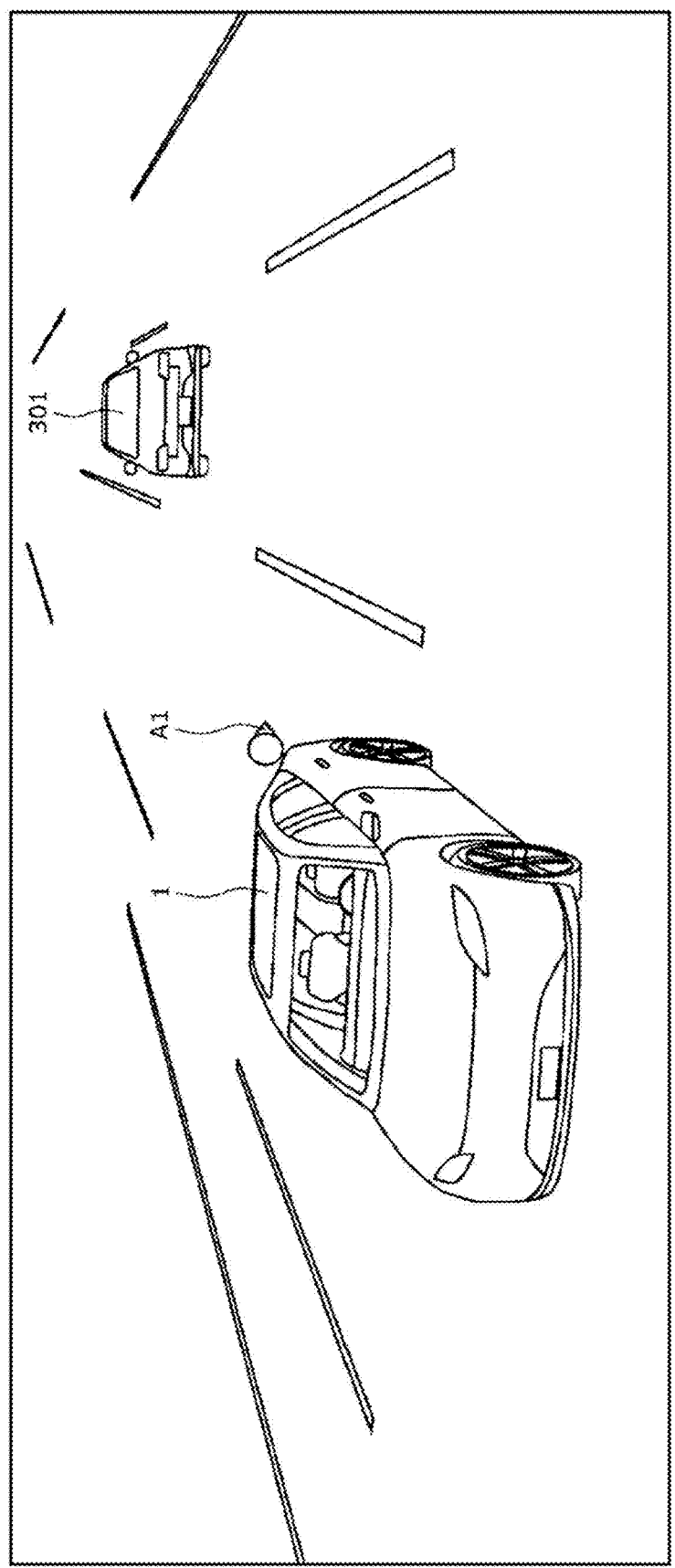
FIG. 9 is a diagram of assistance in explaining warning sound for a vehicle approaching from a leftwardly rearward direction.
Figure 10:
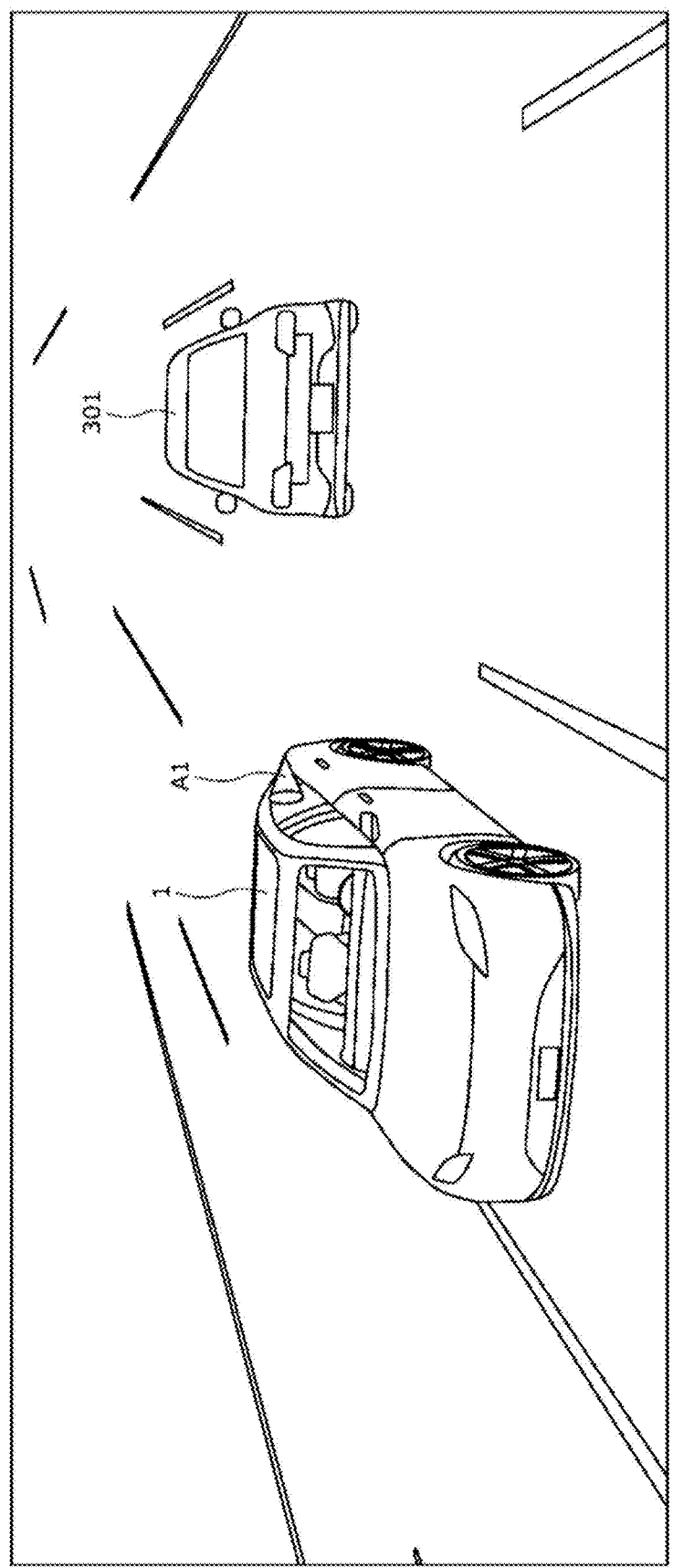
FIG. 10 is a diagram of assistance in explaining warning sound for the vehicle approaching from the leftwardly rearward direction.
Figure 11:
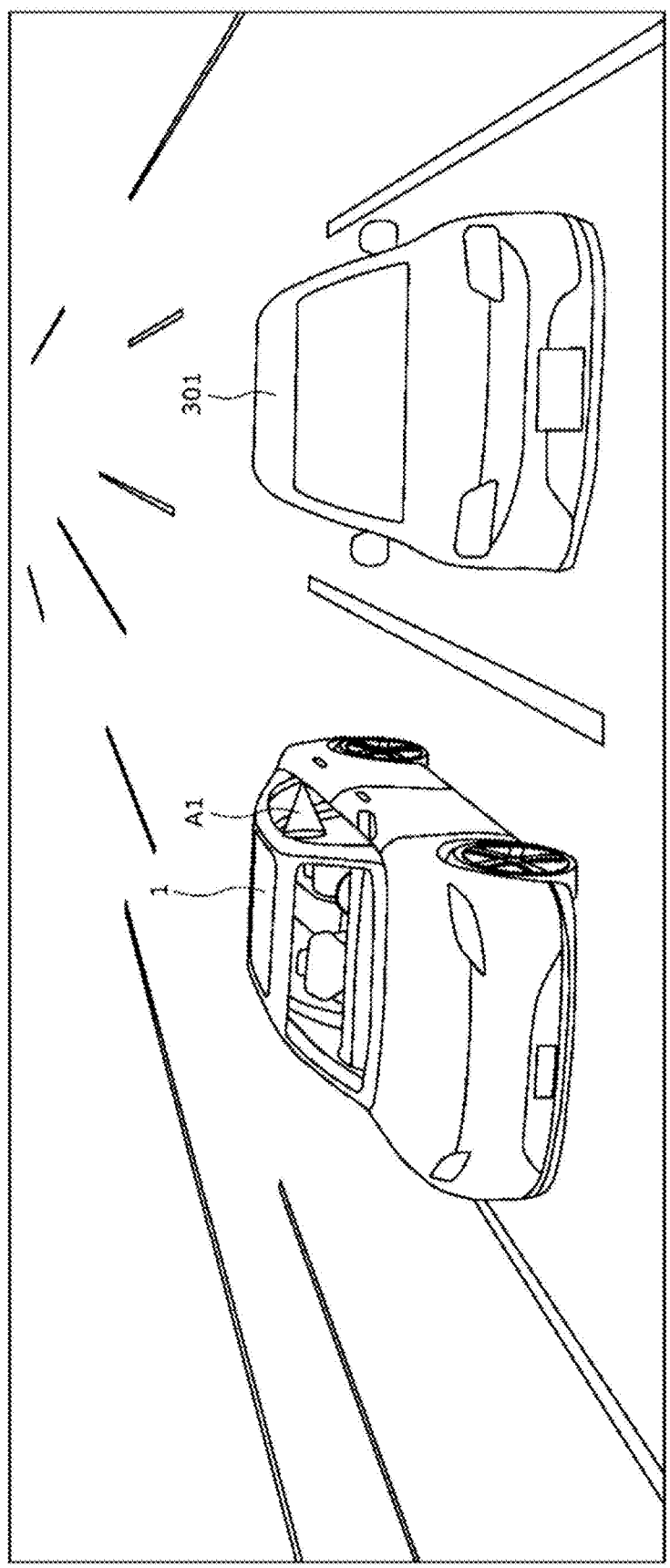
FIG. 11 is a diagram of assistance in explaining warning sound for the vehicle approaching from the leftwardly rearward direction.

FIGS. 9 to 11 illustrate an example of a method of controlling the warning sound for a vehicle 301 approaching from a leftwardly rearward direction.

FIG. 9 illustrates a sound field A1 of the warning sound in a case where the vehicle 301 is present within the zone ZL1. FIG. 10 illustrates the sound field A1 of the warning sound in a case where the vehicle 301 is present within the zone ZL2. FIG. 11 illustrates the sound field A1 of the warning sound in a case where the vehicle 301 is present within the zone ZL3.

Incidentally, the vertex of the conical sound field A1 represents the position of the sound image (virtual sound source). A direction in which a circular cone spreads from the vertex of the sound field A1 represents a direction in which the sound field spreads.

As described above, the orientation of the sound field A1 is set in a direction substantially equal to a direction in which the head of the driver of the vehicle 1 is viewed from the vehicle 301. In addition, the sound image of the warning sound is set at a position separated from the head of the driver in the direction of the vehicle 301 by a predetermined distance. Hence, the sound field A1 moves in such a manner as to be directed in a direction substantially equal to the direction in which the head of the driver of the vehicle 1 is viewed from the vehicle 301. In addition, the sound field A1 moves such that a distance between the sound image of the warning sound and the head of the driver is substantially proportional to a distance between the vehicle 301 and the vehicle 1.

Hence, the driver can recognize the approaching of the vehicle 301 by the warning sound. In addition, the driver can intuitively recognize the speed, distance, and direction of the vehicle 301 by the movement of the warning sound.

Figure 12:
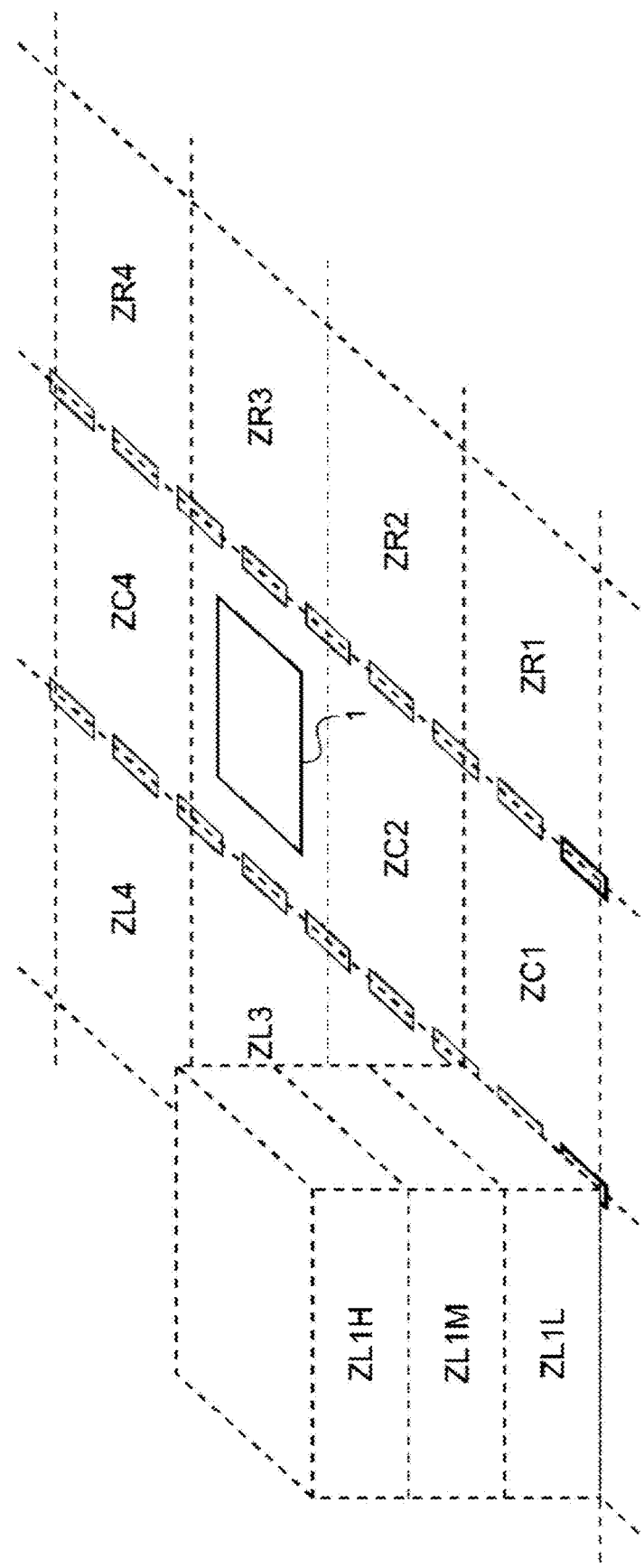
FIG. 12 is a diagram illustrating an example of setting of zones in a height direction.

Incidentally, as illustrated in FIG. 12, the zones may be divided not only in a planar direction but also in a height direction (vertical direction). For example, FIG. 12 illustrates an example in which the zone ZL1 is divided into zones ZL1L to ZL1H in the height direction. Further, the warning sound control section 251 sets the position in the height direction of the sound image of the warning sound for the detected object according to a size as one of attributes of the detected object in the zone ZL1.

Here, the size of the object is, for example, represented by at least one of the width, depth, and height of the object.

For example, in a case where the object has a small size, for example, in a case where the object is a motorbike, a bicycle, or a pedestrian, the position of the sound image of the warning sound is set such that the warning sound is heard at the reference position from the direction of the zone ZL1L. For example, in a case where the object has a medium size, for example, in a case where the object is a passenger car, the position of the sound image of the warning sound is set such that the warning sound is heard at the reference position from the direction of the zone ZL1M. For example, in a case where the object has a large size, for example, in a case where the object is a large-sized vehicle such as a truck or a bus, the position of the sound image of the warning sound is set such that the warning sound is heard at the reference position from the direction of the zone ZL1H.

Thus, even when the object is detected within the same zone in the planar direction, the position in the height direction of the sound image of the warning sound changes according to the size of the object. The driver can thereby intuitively recognize not only the position of the detected object but also the size of the detected object.

In addition, the driver can predict a danger degree of the object by recognizing the size of the object. Here, the danger degree of the object is a degree of danger that the vehicle 1 may be subjected to harm by the object or a degree of danger that the vehicle 1 may cause harm to the object. For example, the driver can predict that the higher the position of the sound image of the warning sound, the higher the degree of danger that the vehicle 1 may be subjected to harm by the object due to a collision or the like, and the lower the degree of danger that the vehicle 1 may cause harm to the object. Conversely, the driver can predict that the lower the position of the sound image of the warning sound, the lower the degree of danger that the vehicle 1 may be subjected to harm by the object due to a collision or the like, and the higher the degree of danger that the vehicle 1 may cause harm to the object.

Thereafter, the processing returns to step S1, and the processing from step S1 on down is performed.

As described above, the driver can hear the warning sound from the direction in which the object is detected, so that accuracy of recognition of the direction in which the object is present is improved. In addition, because the sound image of the warning sound is moved not only in the planar direction but also in the height direction, the driver can recognize the size of the object, and thereby recognize the danger degree of the object.

3. Modifications

Modifications of the embodiment of the present technology described above will be described in the following.

Modifications Related to Zones

A region to which the driver is to pay attention on the periphery of the vehicle 1 changes according to conditions under which the vehicle 1 is placed. Hence, the recognizing section 73 may change the setting of the zones according to the conditions under which the vehicle 1 is placed. In other words, the recognizing section 73 may change the setting of the zones according to the region to which the driver is to pay attention.

Here, changing the setting of the zones means changing the position, number, size, shape, and the like of the zones. In addition, the conditions under which the vehicle 1 is placed include, for example, a place where the vehicle 1 is traveling, an environment on the periphery of the vehicle 1, a driving operation of the vehicle 1, a traveling state of the vehicle 1, and the like.

For example, in a case where the vehicle 1 intends to change lanes, a necessity for the driver to pay attention to vehicles in the traveling lane of the vehicle 1 decreases. Accordingly, in a case where the vehicle 1 intends to change lanes, the recognizing section 73 may not set, for example, the zone ZC1, the zone ZC2, and the zone ZC4 in the traveling lane of the vehicle 1 among the zones in FIG. 7.

For example, in a case where the vehicle 1 is traveling on a road having two lanes on one side and the lane in which the zones ZR1 to ZR4 in FIG. 7 are arranged is an opposite lane, the recognizing section 73 may not set the zones ZR1 to ZR4, for example. Alternatively, for example, in a case where there is an increased necessity for the driver to pay attention to vehicles in the opposite lane for reasons of a narrow width of the road, poor visibility in the forward direction, or the like, the recognizing section 73 may set the zones ZR1 to ZR4, for example.

For example, in a case where the vehicle 1 is traveling in an urban area, the speed of the vehicle 1 and surrounding vehicles is relatively slow, and there are many pedestrians. The driver hence needs to pay more attention to the crossing of a pedestrian in front or the like rather than in the rear. Accordingly, as illustrated in FIG. 13, for example, the recognizing section 73 may set zones ZL11 to ZR14 on the periphery of the vehicle 1.

The zones ZL11 to ZR14 are rectangular regions of substantially the same size. The zone ZC11, the zone ZC13, and the zone ZC14 are arranged in the traveling lane of the vehicle 1. The zone ZC11 is disposed immediately in the rear of the vehicle 1. The zone ZC13 is disposed immediately in front of the vehicle 1. The zone ZC14 is disposed in front of the zone ZC13.

The zones ZL11 to ZL14 are arranged in a lane on the left side of the traveling lane of the vehicle 1. The zones ZR11 to ZR14 are arranged in a lane on the right side of the traveling lane of the vehicle 1. The zone ZL11 and the zone ZR11 are arranged at the same position as the zone ZC11 in the X-axis direction. The zone ZL12 and the zone ZR12 are arranged at the same position as the vehicle 1 in the X-axis direction. The zone ZL13 and the zone ZR13 are arranged at the same position as the zone ZC13 in the X-axis direction. The zone ZL14 and the zone ZR14 are arranged at the same position as the zone ZC14 in the X-axis direction.

Figure 13:
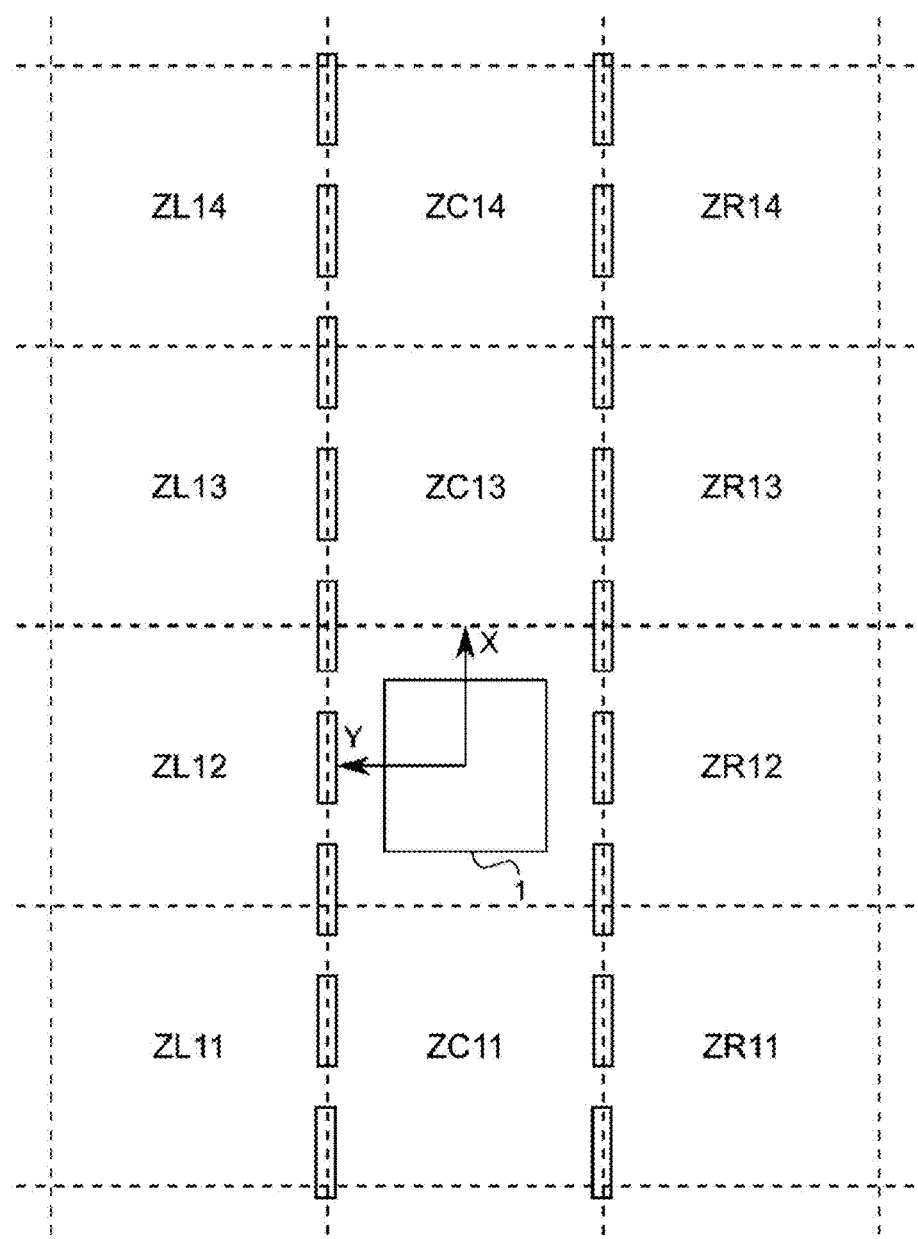
FIG. 13 is a diagram illustrating an example of setting of zones in the planar direction.

Thus, in the example of FIG. 13, as compared with the example of FIG. 7, the zones in the rear of the vehicle 1 are reduced, and the zones in front of the vehicle 1 are increased.

For example, in a case where the vehicle 1 is backed, more attention needs to be paid to the rear of the vehicle 1. Accordingly, as illustrated in FIG. 14, for example, the recognizing section 73 may set zones ZL21 to ZR25 on the periphery of the vehicle 1.

The zones ZL21 to ZR25 are rectangular regions of substantially the same size. The zones ZC21 to ZC23 and the zone ZC25 are arranged in the traveling lane of the vehicle 1. The zone ZC23 is disposed immediately in the rear of the vehicle 1. The zone ZC22 is disposed in the rear of the zone ZC23. The zone ZC21 is disposed in the rear of the zone ZC22. The zone ZC25 is disposed immediately in front of the vehicle 1.

The zones ZL21 to ZL25 are arranged in a lane on the left side of the traveling lane of the vehicle 1. The zones ZR21 to ZR25 are arranged in a lane on the right side of the traveling lane of the vehicle 1. The zone ZL21 and the zone ZR21 are arranged at the same position as the zone ZC21 in the X-axis direction. The zone ZL22 and the zone ZR22 are arranged at the same position as the zone ZC22 in the X-axis direction. The zone ZL23 and the zone ZR23 are arranged at the same position as the zone ZC23 in the X-axis direction. The zone ZL24 and the zone ZR24 are arranged at the same position as the vehicle 1 in the X-axis direction. The zone ZL25 and the zone ZR25 are arranged at the same position as the zone ZC25 in the X-axis direction.

Figure 14:
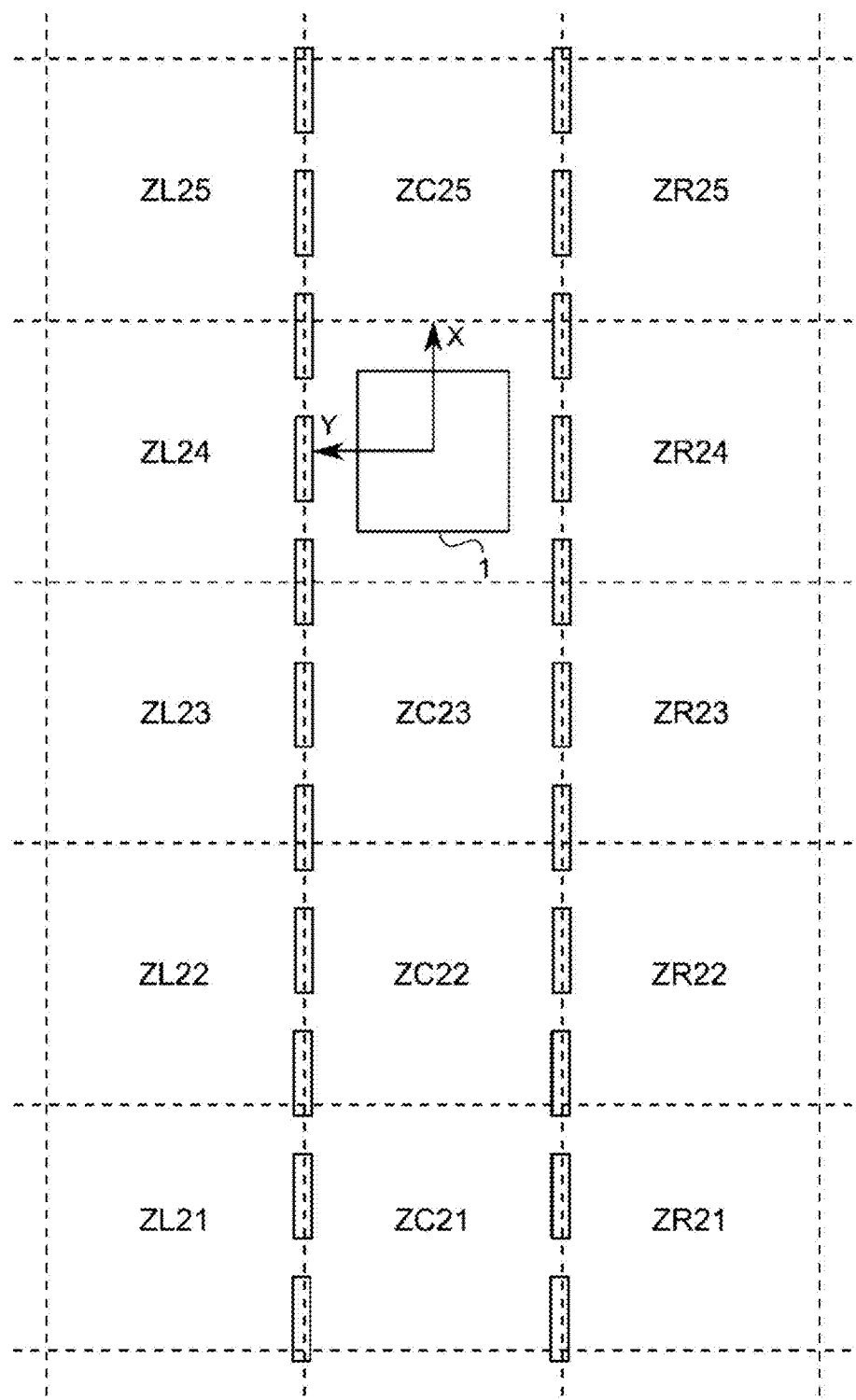
FIG. 14 is a diagram illustrating an example of setting of zones in the planar direction.

Thus, in the example of FIG. 14, as compared with the example of FIG. 7, the zones in the rear of the vehicle 1 are increased.

For example, in a case where the vehicle 1 is parked in a parking lot, there is a higher possibility of another vehicle approaching from a side of the vehicle 1 than from the front and the rear of the vehicle, and therefore more attention needs to be paid to sides of the vehicle 1. Accordingly, as illustrated in FIG. 15, for example, the recognizing section 73 may set zones ZL31A to ZR32C on the periphery of the vehicle 1.

The zones ZL31A to ZR32C are rectangular regions of substantially the same size. The zone ZL31A is disposed on the left of the vehicle 1. The zone ZL31B is disposed on the left of the zone ZL31A. The zone ZL31C is disposed on the left of the zone ZL31B. The zone ZR31A is disposed on the right of the vehicle 1. The zone ZR31B is disposed on the right of the zone ZR31A. The zone ZR31C is disposed on the left of the zone ZR31B. The zone ZC32 is disposed immediately in front of the vehicle 1. The zone ZL32A is disposed on the left of the zone ZC32. The zone ZL32B is disposed on the left of the zone ZL32A. The zone ZL32C is disposed on the left of the zone ZL32B. The zone ZR32A is disposed on the right of the zone ZC32. The zone ZR32B is disposed on the right of the zone ZR32A. The zone ZR32C is disposed on the left of the zone ZR32B.

Figure 15:
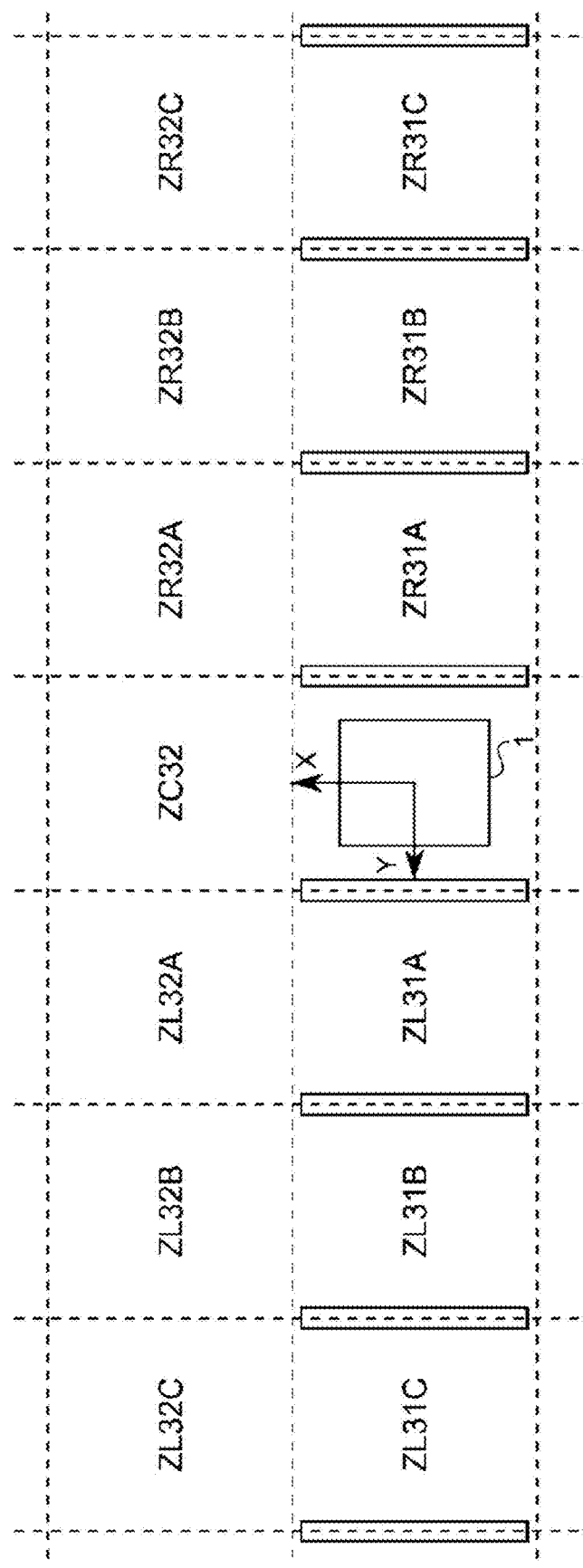
FIG. 15 is a diagram illustrating an example of setting of zones in the planar direction.

Thus, in the example of FIG. 15, as compared with the other examples, the zones are increased on the sides of the vehicle 1.

As described above, the setting of the zones may be changed according to the conditions under which the vehicle 1 is placed. Consequently, the warning sound for the object on the periphery of the vehicle 1 can be output more appropriately according to the conditions.

Incidentally, while an example in which the size and shape of each of the zones are made uniform has been illustrated in the above description, the size and shape of each of the zones may be made different.

In addition, for example, the warning sound control section 251 may set the position of the sound image of the warning sound simply according to the position of the detected object without setting the zones.

Modifications Related to Warning Sound

For example, the recognizing section 73 may estimate the danger degree of a detected object, and the warning sound control section 251 may control a feature quantity of the warning sound according to the estimated danger degree of the object.

For example, the warning sound control section 251 changes the feature quantity of the warning sound such that the closer the zone in which the object is detected becomes, that is, the more the detected object approaches the vehicle 1, the more the driver is alerted. Consequently, the higher the danger degree of the detected object, the more surely the driver can recognize the presence and direction of the object and direct attention to the object.

Figure 16:
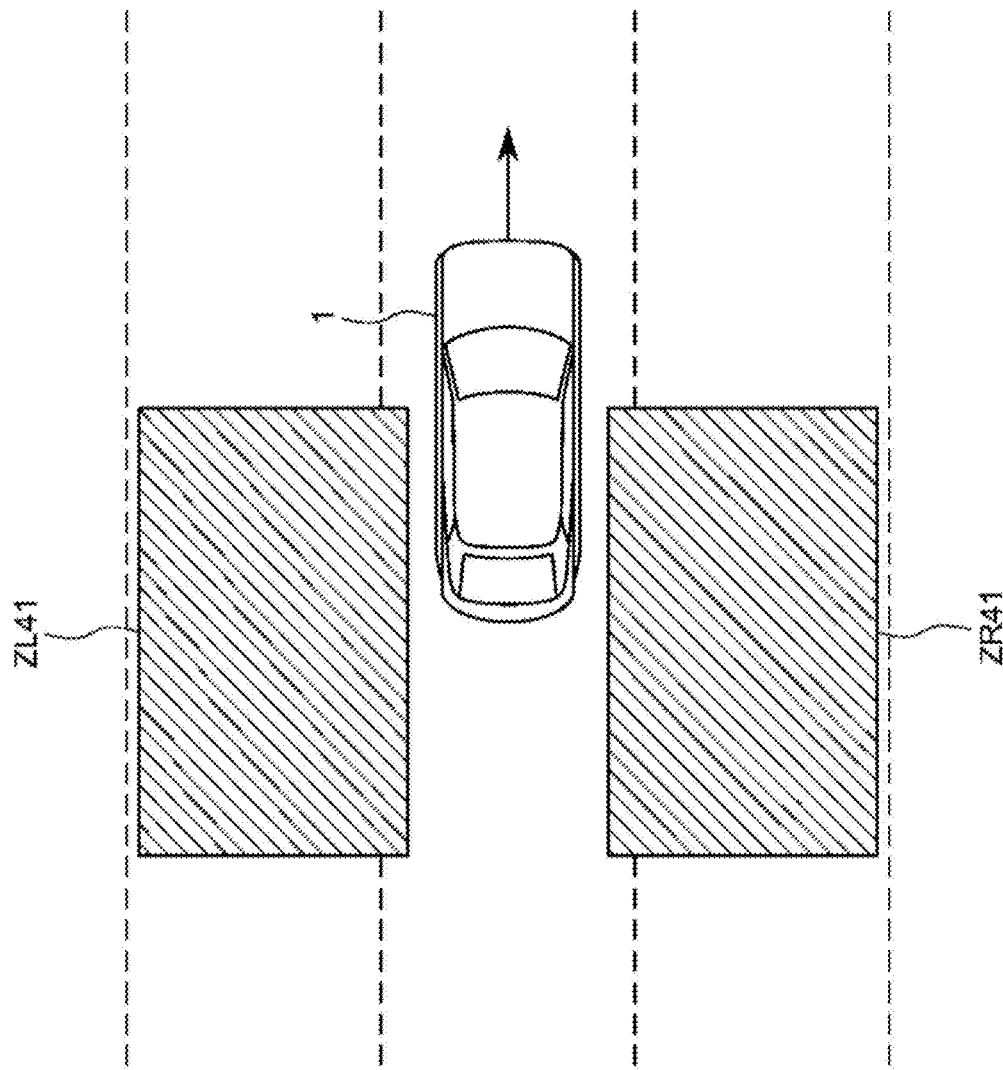
FIG. 16 is a diagram of assistance in explaining an example of controlling a feature quantity of warning sound according to a zone in which an object is present.
Figure 17:
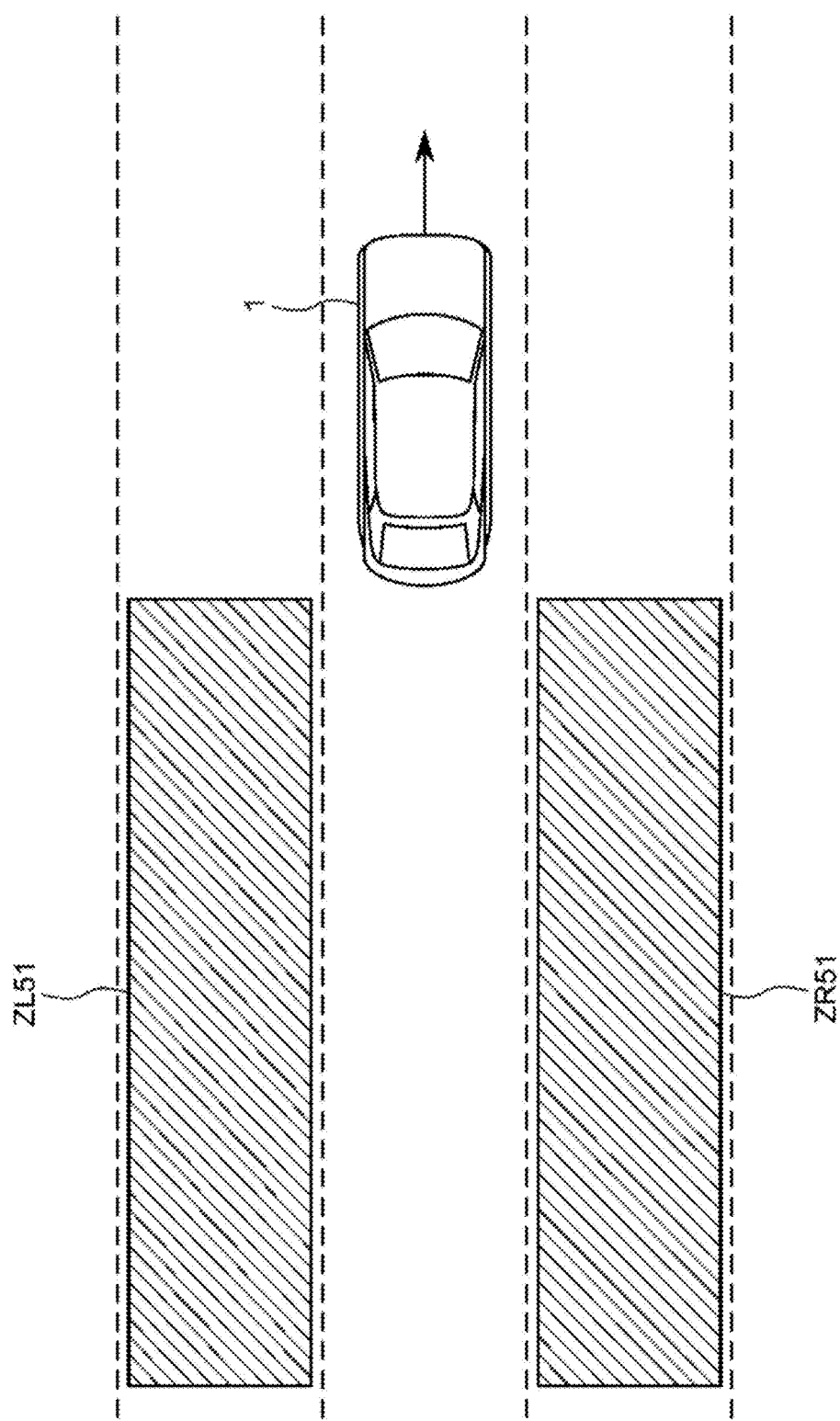
FIG. 17 is a diagram of assistance in explaining an example of controlling a feature quantity of warning sound according to a zone in which an object is present.

For example, a comparison of a zone ZL41 to the left rear of the vehicle 1 in FIG. 16 and a zone ZR41 to the right rear of the vehicle 1 in FIG. 16 with a zone ZL51 to the left rear of the vehicle 1 in FIG. 17 and a zone ZR51 to the right rear of the vehicle 1 in FIG. 17 indicates that the zone ZL41 and the zone ZR41 are closer to the vehicle 1 than the zone ZL51 and the zone ZR51. Hence, in a case where an object is present within the zone ZL41 or the zone ZR41, the warning sound control section 251, for example, makes the warning sound high pitched (raised to a high frequency) as compared with a case where the object is present within the zone ZL51 or the zone ZR51.

For example, the higher the relative speed of the object with respect to the vehicle 1, the relative speed being in a direction in which the object approaches the vehicle 1, the higher the degree of danger that the vehicle 1 may collide with the object. Accordingly, even when the object is detected within the same zone, the warning sound control section 251, for example, increases the volume of the warning sound as the relative speed of the detected object in the direction of approaching the vehicle 1 is increased.

In addition, for example, the warning sound control section 251 may vary the feature quantity of the warning sound between a case where there is a higher possibility of the vehicle 1 being subjected to harm by the detected object and a case where there is a higher possibility of the vehicle 1 causing harm to the detected object. For example, in a case where the detected object is a truck, a bus, a passenger car, or the like, it is determined that there is a higher possibility of the vehicle 1 being subjected to harm. For example, in a case where the detected object is a motorbike, a bicycle, a pedestrian, or the like, it is determined that there is a higher possibility of the vehicle 1 causing harm.

The driver can thereby intuitively recognize whether the own vehicle (vehicle 1) is a harm-subjected side or a harm causing side. Then, the driver can take more appropriate action for the detected object according to whether the own vehicle is a harm-subjected side or a harm causing side.

In addition, for example, in a case where the vehicle 1 has a speaker or the like that outputs sound to the periphery, the warning sound control section 251 may control the output of a warning sound indicating the presence of the vehicle 1 to the detected object, according to the degree of danger that the vehicle 1 may cause harm to the detected object. It is thereby possible to alert, for example, a motorbike, a bicycle, a pedestrian, or the like on the periphery of the vehicle 1, and thus prevent an accident.

Further, for example, the warning sound control section 251 may change the feature quantity of the warning sound according to an attribute of the detected object. For example, the warning sound control section 251 may change the feature quantity of the warning sound according to the kind or size of the detected object. The driver can thereby intuitively recognize the attribute of the detected object.

In addition, in a case where multiple objects are detected at the same time, the warning sound control section 251 may output multiple warning sounds to the respective objects at the same time. In this case, the warning sound control section 251 may vary the feature quantity of each warning sound in order to facilitate recognition of the warning sounds directed to the respective objects. For example, the warning sound control section 251 may vary the feature quantities of the warning sounds output to the respective objects, according to the danger degrees of the respective objects, as described above.

Incidentally, for example, in a case where multiple detected objects are traveling in a column, the warning sound control section 251 may assume the multiple objects traveling in a column to be one object, and output a warning sound to the one assumed object.

In addition, for example, the warning sound control section 251 may output the warning sound when an object is detected within a zone in a case where the vehicle 1 performs a predetermined operation.

For example, the warning sound control section 251 may output the warning sound when an object is detected within a zone in a case where the vehicle 1 intends to change lanes or change in direction (for example, in a case where a turn signal of the vehicle 1 is turned on). In this case, the warning sound is used as one function of a lane change decision support system ((LCDAS) Lane Change Decision Aid Systems).

For example, the warning sound control section 251 may output the warning sound when an object is detected within a zone in a case where the vehicle 1 intends to back (for example, in a case where the vehicle 1 is set to a reverse gear).

Further, for example, in a case where the recognizing section 73 detects a dangerous place, the warning sound control section 251 may output the warning sound for the dangerous place by a method similar to that in a case where the above-described object is detected.

Here, assumed as the dangerous place is, for example, a place where accidents occur frequently, a place where there is a strong possibility of occurrence of accidents, or the like. Assumed as a place where there is a strong possibility of occurrence of accidents is, for example, the vicinity of an entrance to a park or a school or the vicinity of a construction site.

In addition, for example, in a case where the vehicle 1 performs automated driving, basically, the vehicle 1 automatically avoids danger and travels safely, and hence, the warning sound does not necessarily need to be output for the detected object as described above.

On the other hand, for example, in a situation in which the vehicle 1 performs an operation for changing lanes, changing in direction, parking, overtaking, departing, or the like during automated driving, there is assumed a case in which an object that constitutes an obstacle is detected and the operation is stopped. In this case, for example, the warning sound control section 251 may output the warning sound for the detected object. For example, in a case where the vehicle 1 does not turn right even though the vehicle 1 has turned on the turn signal with an intention to turn right, the warning sound control section 251 may output the warning sound for the object that has caused the vehicle 1 to stop turning right. Consequently, the occupant(s) can be made to recognize the cause that has made the vehicle 1 stop the operation, and be given a sense of security.

In addition, for example, in a case where the vehicle 1 detects an object posing a high degree of danger and automatically performs a danger avoiding operation such as a pre-crash safety operation, the warning sound control section 251 may output a warning sound for the object that has become the cause of the danger avoiding operation. Consequently, the occupant(s) can be made to recognize the cause that has made the vehicle 1 perform the danger avoiding operation, and be given a sense of security.

Further, for example, by road-to-vehicle communication, the recognizing section 73 can detect an object even in a zone as a blind spot that makes detection by the external recognition sensor 25 difficult at an intersection or the like. Also in this case, the warning sound control section 251 can output the warning sound for the detected object by a method similar to the above-described method.

In addition, for example, the occupant(s) may feel annoyed when the warning sound continues to be output to vehicles on the periphery of the vehicle 1 during congestion. Accordingly, for example, the recognizing section 73 may recognize the vehicles during the congestion, and the warning sound control section 251 may exclude the vehicles during the congestion from targets of the warning sound. In addition, in a case where an object other than the vehicles during the congestion is detected within a zone, the warning sound control section 251 may output the warning sound to the object. Consequently, for example, the warning sound can be output to a motorbike or the like that passes by the sides of the vehicles during the congestion.

Further, for example, the warning sound may be output only to a particular occupant (for example, the driver) by using the respective seat speaker 204.

Other Modifications

The present technology can use a sound image localization technology other than 360RA.

Vehicles to which the present technology is applicable are not particularly limited to any kind. In addition, the present technology is applicable not only to vehicles but also to mobile devices such as a personal mobility device, a transportation robot, an airplane, a ship, a construction machine, and an agricultural machine.

4. Others

Example of Configuration of Computer

The above-described series of processing can be performed by hardware, or can be performed by software. In a case where the series of processing is performed by software, a program constituting the software is installed on a computer. Here, the computer includes a computer incorporated in dedicated hardware, a general-purpose personal computer, for example, capable of performing various kinds of functions by installing various kinds of programs thereon, and the like.

Figure 18:
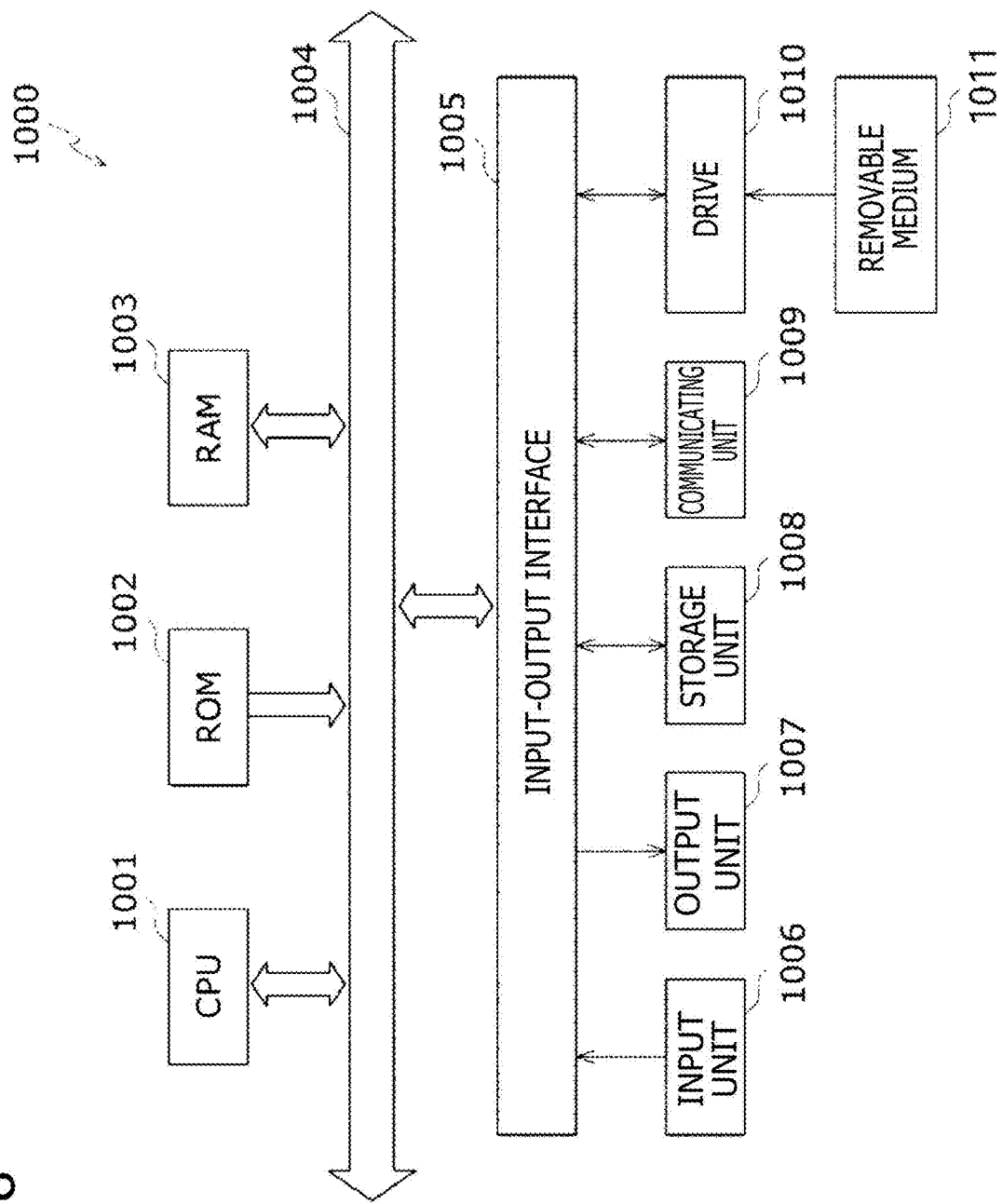
FIG. 18 is a diagram illustrating an example of a configuration of a computer.

FIG. 18 is a block diagram illustrating an example of a configuration of hardware of a computer that performs the above-described series of processing by a program.

In a computer 1000, a CPU (Central Processing Unit) 1001, a ROM (Read Only Memory) 1002, and a RAM (Random Access Memory) 1003 are interconnected by a bus 1004.

An input-output interface 1005 is further connected to the bus 1004. The input-output interface 1005 is connected with an input unit 1006, an output unit 1007, a recording unit 1008, a communicating unit 1009, and a drive 1010.

The input unit 1006 includes an input switch, a button, a microphone, an imaging element, and the like. The output unit 1007 includes a display, a speaker, and the like. The recording unit 1008 includes a hard disk, a nonvolatile memory, and the like. The communicating unit 1009 includes a network interface and the like. The drive 1010 drives a removable medium 1011 such as a magnetic disk, an optical disk, a magneto-optical disk, a semiconductor memory, or the like.

In the computer 1000 configured as described above, the CPU 1001, for example, loads a program recorded in the recording unit 1008 into the RAM 1003 via the input-output interface 1005 and the bus 1004, and executes the program. The series of processing described above is thereby performed.

The program to be executed by the computer 1000 (CPU 1001) can, for example, be provided in a state of being recorded on the removable medium 1011 as a package medium or the like. In addition, the program can be provided via a wired or radio transmission medium such as a local area network, the Internet, or digital satellite broadcasting.

In the computer 1000, the program can be installed in the recording unit 1008 via the input-output interface 1005 by loading the removable medium 1011 into the drive 1010. In addition, the program can be received by the communicating unit 1009 via the wired or radio transmission medium, and installed in the recording unit 1008. Besides, the program can be installed in the ROM 1002 or the recording unit 1008 in advance.

Incidentally, the program executed by the computer may be a program in which processing is performed in time series in the order described in the present specification, or may be a program in which processing is performed in parallel or in necessary timing when a call is made, for example.

In addition, in the present specification, a system refers to a set of multiple constituent elements (devices, modules (parts), or the like), and it does not matter whether or not all of the constituent elements are present in the same casing. Hence, multiple devices housed in separate casings and connected to each other via a network and one device having multiple modules housed in one casing are both a system.

Further, embodiments of the present technology are not limited to the foregoing embodiment, and are susceptible of various modifications without departing from the spirit of the present technology.

For example, the present technology can adopt a configuration of cloud computing in which multiple devices share and jointly process one function via a network.

In addition, each step described in the above-described flowchart can be not only performed by one device but also shared and performed by multiple devices.

Further, in a case where one step includes multiple pieces of processing, the multiple pieces of processing included in the one step can be not only performed by one device but also shared and performed by multiple devices.

Example of Configuration Combinations

The present technology can also adopt the following configurations.

(1)

An information processing device including:
a recognizing section configured to perform detection processing for an object on a periphery of a mobile device; and
a warning sound control section configured to control a feature quantity of a first warning sound, the first warning sound indicating presence of the object, and a position of a sound image of the first warning sound, according to a position of the detected object.

(2)

The information processing device according to (1) above, in which
the recognizing section detects a relative speed of the object with respect to the mobile device, and
the warning sound control section controls the feature quantity of the first warning sound according to also the relative speed of the object.

(3)

The information processing device according to (1) or (2) above, in which
the recognizing section recognizes an attribute of the object, and
the warning sound control section controls at least one of the feature quantity of the first warning sound and the position of the sound image of the first warning sound according to also the attribute of the object.

(4)

The information processing device according to (3) above, in which
the attribute of the object includes a size of the object, and
the warning sound control section controls a position in a height direction of the sound image of the first warning sound according to the size of the object.

(5)

The information processing device according to any one of (1) through (4) above, in which
the recognizing section estimates a danger degree of the object, and
the warning sound control section controls the feature quantity of the first warning sound according to also the danger degree of the object.

(6)

The information processing device according to (5) above, in which
the recognizing section estimates which of a possibility of the mobile device causing harm to the object and a possibility of the mobile device being subjected to harm by the object is higher, and
the warning sound control section varies the feature quantity of the first warning sound between a case where the possibility of the mobile device causing harm to the object is higher and a case where the possibility of the mobile device being subjected to harm by the object is higher.

(7)

The information processing device according to (5) or (6) above, in which
the warning sound control section controls output of a second warning sound indicating presence of the mobile device to the object, according to a degree of danger that the mobile device causes harm to the object.

(8)

The information processing device according to any one of (1) through (7) above, in which,
in a case where multiple objects are detected, the warning sound control section performs control to output multiple first warning sounds each indicating presence of a corresponding one of the objects the objects at a same time.

(9)

The information processing device according to (8) above, in which
the recognizing section estimates danger degrees of the respective objects, and
the warning sound control section controls respective feature quantities of the first warning sounds according to the danger degrees of the respective objects.

(10)

The information processing device according to (8) or (9) above, in which,
in a case where the multiple objects are traveling in a column, the warning sound control section regards the multiple objects as one object, and performs control to output the first warning sound.

(11)

The information processing device according to any one of (1) through (10) above, in which
the recognizing section sets multiple zones on the periphery of the mobile device and detects a zone in which the object is present, and
the warning sound control section controls the feature quantity of the first warning sound and the position of the sound image of the first warning sound according to the zone in which the object is present.

(12)

The information processing device according to (11) above, in which
the recognizing section changes the setting of the zones according to conditions under which the mobile device is placed.

(13)

The information processing device according to any one of (1) through (12) above, in which
the warning sound control section performs control to output the first warning sound when the object is detected in a case where the mobile device performs a predetermined operation.

(14)

The information processing device according to any one of (1) through (13) above, in which
the warning sound control section performs control to output the first warning sound when the mobile device stops a predetermined operation due to the detected object in a case where the mobile device is performing automated driving.

(15)

The information processing device according to any one of (1) through (14) above, in which
the recognizing section recognizes the object on the periphery of the mobile device by road-to-vehicle communication, and
the warning sound control section performs control to output the first warning sound in a case where the object is recognized in a blind spot of the mobile device by the road-to-vehicle communication.

(16)

The information processing device according to any one of (1) through (15) above, in which
the recognizing section obtains information regarding a road on which the mobile device is traveling, according to at least one of a sensor included in the mobile device and a map of the periphery of the mobile device, and corrects the position of the object in reference to the information regarding the road.

(17)

An information processing method including the steps of:
performing detection processing for an object on a periphery of a mobile device; and
controlling a feature quantity of a warning sound, the warning sound indicating presence of the object, and a position of a sound image of the warning sound, according to a position of the detected object.

(18)

A program for making a computer perform processing including:
performing detection processing for an object on a periphery of a mobile device; and
controlling a feature quantity of a warning sound, the warning sound indicating presence of the object, and a position of a sound image of the warning sound, according to a position of the detected object.

(19)

A mobile device including:
a recognizing section configured to perform detection processing for an object on a periphery of the mobile device; and
a warning sound control section configured to control a feature quantity of a warning sound, the warning sound indicating presence of the object, and a position of a sound image of the warning sound, according to a position of the detected object.

(20)

An information processing system including:
a sensor unit configured to sense a periphery of a mobile device;
a recognizing section configured to perform detection processing for an object on the periphery of the mobile device in reference to a result of sensing by the sensor unit;
a warning sound control section configured to control a feature quantity of a warning sound, the warning sound indicating presence of the object, and a position of a sound image of the warning sound, according to a position of the detected object; and
a speaker configured to output the warning sound under control of the warning sound control section.

It is to be noted that the effects described in the present specification are merely illustrative and are not limitative, and that there may be other effects.

REFERENCE SIGNS LIST

1: Vehicle
11: Vehicle control system
25: External recognition sensor
31: HMI
51: Camera
52: Radar 53: LiDAR
54: Ultrasonic sensor
73: Recognizing section
62: Action planning section
63: Operation control section
202FL to 202BR: Speaker
251: Warning sound control section

The invention claimed is:

1. An information processing device comprising:
control circuitry configured to:
perform detection processing for an object on a periphery of a mobile device; and control a feature quantity of a first warning sound, the first warning sound indicating presence of the object, and a position of a sound image of the first warning sound, according to a position of the detected object,
wherein the control circuitry:
estimates a danger degree of the object,
wherein the estimated danger degree of the object is zone specific such that the object is estimated to have a first danger degree when the mobile device is in a first zone, and a second danger degree when the mobile device is in a second zone previously determined to have a higher degree of danger than the first zone,
controls the feature quantity of the first warning sound according to the estimated danger degree of the object,
estimates which of a possibility of the mobile device causing harm to the object and a possibility of the mobile device being subjected to harm by the object is higher, and varies the feature quantity of the first warning sound between a case where the possibility of the mobile device causing harm to the object is higher and a case where the possibility of the mobile device being subjected to harm by the object is higher,
based on multiple objects being detected, determines whether the multiple objects are traveling in a column, and
based on the multiple objects being determined to be traveling in a column, regards the multiple objects as one object, and performs control to output the first warning sound, otherwise performs control to output multiple first warning sounds each indicating presence of a corresponding one of the objects at a same time.

2. The information processing device according to claim 1, wherein the control circuitry:
detects a relative speed of the object with respect to the mobile device, and
controls the feature quantity of the first warning sound according to also the relative speed of the object.

3. The information processing device according to claim 1, wherein the control circuitry:
recognizes an attribute of the object, and
controls at least one of the feature quantity of the first warning sound and the position of the sound image of the first warning sound according to the attribute of the object.

4. The information processing device according to claim 3, wherein
the attribute of the object includes a size of the object, and
the control circuitry controls a position in a height direction of the sound image of the first warning sound according to the size of the object.

5. The information processing device according to claim 1, wherein
the control circuitry controls output of a second warning sound indicating presence of the mobile device to the object, according to a degree of danger that the mobile device causes harm to the object.

6. The information processing device according to claim 1, wherein the control circuitry:
estimates danger degrees of respective objects of the multiple objects being detected and not determined to be traveling in the column, and
controls respective feature quantities of the first warning sounds according to the danger degrees of the respective objects.

7. The information processing device according to claim 1, wherein
the control circuitry performs control to output the first warning sound when the object is detected in a case where the mobile device performs a predetermined operation.

8. The information processing device according to claim 1, wherein
the control circuitry performs control to output the first warning sound when the mobile device stops a predetermined operation due to the detected object in a case where the mobile device is performing automated driving.

9. The information processing device according to claim 1, wherein the control circuitry:
recognizes the object on the periphery of the mobile device by road-to-vehicle communication, and
performs control to output the first warning sound in a case where the object is recognized in a blind spot of the mobile device by the road-to-vehicle communication.

10. The information processing device according to claim 1, wherein
the control circuitry obtains information regarding a road on which the mobile device is traveling, according to at least one of a sensor included in the mobile device and a map of the periphery of the mobile device, and corrects the position of the detected object in reference to the information regarding the road.

11. An information processing method performed by an information processing device, the information processing method comprising:
performing detection processing for an object on a periphery of a mobile device; and
controlling a feature quantity of a warning sound, the warning sound indicating presence of the object, and a position of a sound image of the warning sound, according to a position of the detected object,
wherein the information processing method further comprises:
estimating a danger degree of the object,
wherein the estimated danger degree of the object is zone specific such that the object is estimated to have a first danger degree when the mobile device is in a first zone, and a second danger degree when the mobile device is in a second zone previously determined to have a higher degree of danger than the first zone,
controlling the feature quantity of the first warning sound according to the estimated danger degree of the object,
estimating which of a possibility of the mobile device causing harm to the object and a possibility of the mobile device being subjected to harm by the object is higher, and varies the feature quantity of the first warning sound between a case where the possibility of the mobile device causing harm to the object is higher and a case where the possibility of the mobile device being subjected to harm by the object is higher, based on multiple objects being detected, determining whether the multiple objects are traveling in a column, based on the multiple objects being determined to be traveling in a column, regarding the multiple objects as one object, and performing control to output the first warning sound, and otherwise performing control to output multiple first warning sounds each indicating presence of a corresponding one of the objects at a same time.

12. A non-transitory computer product containing instructions for causing a computer to perform processing comprising:

performing detection processing for an object on a periphery of a mobile device; and controlling a feature quantity of a warning sound, the warning sound indicating presence of the object, and a position of a sound image of the warning sound, according to a position of the detected object, wherein the information processing method further comprises:

estimating a danger degree of the object, and wherein the estimated danger degree of the object is zone specific such that the object is estimated to have a first danger degree when the mobile device is in a first zone, and a second danger degree when the mobile device is in a second zone previously determined to have a higher degree of danger than the first zone, controlling the feature quantity of the first warning sound according to the estimated danger degree of the object, estimating which of a possibility of the mobile device causing harm to the object and a possibility of the mobile device being subjected to harm by the object is higher, and varies the feature quantity of the first warning sound between a case where the possibility of the mobile device causing harm to the object is higher and a case where the possibility of the mobile device being subjected to harm by the object is higher, based on multiple objects being detected, determining whether the multiple objects are traveling in a column, based on the multiple objects being determined to be traveling in a column, regarding the multiple objects as one object, and performing control to output the first warning sound, otherwise performing control to output multiple first warning sounds each indicating presence of a corresponding one of the objects at a same time.

13. A mobile device comprising:

a transceiver configured for mobile communications; and the information processing device according to claim 1.

14. An information processing system comprising:

a sensor configured to sense the periphery of the mobile device; and the information processing device according to claim 1; and a speaker configured to output the warning sound under control of the warning sound control section.

* * * * *